(12) United States Patent
Fruchter et al.

(10) Patent No.: US 11,269,777 B2
(45) Date of Patent: Mar. 8, 2022

(54) SYSTEMS AND METHODS FOR EFFICIENT DATA BUFFERING

(71) Applicant: Facebook Technologies, LLC, Menlo Park, CA (US)

(72) Inventors: Vlad Fruchter, Los Altos, CA (US); Richard Lawrence Greene, Kirkland, WA (US); Hideo Tamama, Kirkland, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 185 days.

(21) Appl. No.: 16/582,374

(22) Filed: Sep. 25, 2019

(65) Prior Publication Data
US 2021/0089458 A1  Mar. 25, 2021

(51) Int. Cl.
*G06F 12/0871* (2016.01)
*G06F 12/02* (2006.01)
*G06F 12/14* (2006.01)
*G06F 3/06* (2006.01)

(52) U.S. Cl.
CPC .......... *G06F 12/0871* (2013.01); *G06F 3/061* (2013.01); *G06F 3/0656* (2013.01); *G06F 3/0673* (2013.01); *G06F 12/0238* (2013.01); *G06F 12/0284* (2013.01); *G06F 12/1441* (2013.01)

(58) Field of Classification Search
CPC ............. G06F 12/0871; G06F 12/0238; G06F 12/0284; G06F 12/1441; G06F 3/061; G06F 3/0656; G06F 3/0673; G06F 3/0679
See application file for complete search history.

(56) References Cited

U.S. PATENT DOCUMENTS

2017/0256016 A1*  9/2017  Lee ........................... G06T 1/60
2019/0196745 A1*  6/2019  Persson ................. G06F 3/0659

FOREIGN PATENT DOCUMENTS

WO    WO 2015/019197 A2    2/2015

OTHER PUBLICATIONS

International Search Report and Written Opinion for International Application No. PCT/US2020/049596, dated Dec. 16, 2020.

* cited by examiner

*Primary Examiner* — Ramon A. Mercado
(74) *Attorney, Agent, or Firm* — Baker Botts L.L.P.

(57) ABSTRACT

In one embodiment, a system may include a memory unit, a first processing unit configured to write data into a memory region of the memory unit, a second processing unit configured to read data from the memory region, a first control unit configured to control the first processing unit's access to the memory unit and, and a second control unit configured to control the second processing unit's access to the memory unit. The second control unit may be configured to obtain, from the first control unit, a first memory address associated with a data writing process of the first processing unit, receive a read request from the second processing unit, the read request having an associated second memory address, and delay execution of the read request based on a comparison of the first memory address and the second memory address.

20 Claims, 15 Drawing Sheets

SYSTEMS AND METHODS FOR EFFICIENT DATA BUFFERING

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to a generic configurable framework including a number of distributed bridging units (e.g., also referred to as control units or racing control units (RCUs)) for coordinating a data producing unit to share data with one or more data consuming units through a dynamically allocated buffer (e.g., a linear buffer or a circular buffer) in a shared memory unit (e.g., rather than dedicated memory unit). The framework may include a number of bridging units each being associated with a data producing unit or a data consuming unit. The bridging units may be connected to the shared memory unit through a network (e.g., a network on chip) for transmitting data and/or control commands. The bridging units may control the memory access of the respective data producing unit and data consuming units. The dynamically allocated buffer could be a linear buffer or circular buffer for passing data from the data producing unit to the data consuming units. The bridging units may be connected to each other through communication links (e.g., a ring bus, a point-to-point link) for exchanging memory address information.

In particular embodiments, a data producing unit may generate and write data into a guarded writing region (also referred to as a guarded writing window) in the buffer while the data consuming units read data from a guarded reading region (also referred to as a guarded reading window) of the buffer. A first bridging unit associated with the data producing unit may send a first memory address (e.g., a position tracker of the guarded writing region such as a starting address or a reference address of the guarded writing region, or a current write pointer address) to one or more bridging units associated with the data consuming units. The bridging units associated with the data consuming units may determine the guarded writing region of the buffer based on the first memory address and prevent the corresponding data consuming units from accessing the guarded writing region of the buffer. The bridging units associated with data consuming units may send a second memory address, associated with the data reading processes of the data consuming units, to the first bridging unit associated with the data producing unit. The first bridging unit may determine the guarded reading region of the buffer based on the second memory address and prevent the data producing unit from accessing the guarded reading region. The data producing unit may access the guarded writing region of the buffer using a raster scanning pattern, a tile-row scanning pattern, a slice scanning pattern, or a random accessing pattern. The data consuming unit may access the guarded reading region of the buffer using a raster scanning pattern, a tile-row scanning pattern, a slice scanning pattern, or a random accessing pattern. The data consuming units may access the guarded reading region using a pattern which could be the same to or different from the memory accessing pattern of the data producing unit. The data consuming units may start to read data from buffer, as soon as the data producing unit generates a programmable data amount (e.g., a minimum data amount allowing the data consuming units to work on), without waiting for the data producing unit to finish generating a whole frame of data. By using distributed bridging units, the framework could reduce the memory footprint of the buffer for sharing data and reduce the latency and the total execution time of the data processing pipeline including the data producing unit and data consuming units.

In an embodiment, a system may comprise: a memory unit; a first processing unit configured to write data into a memory region of the memory unit; a second processing unit configured to read data from the memory region; a first control unit configured to control the first processing unit's access to the memory unit; and a second control unit configured to control the second processing unit's access to the memory unit; wherein the second control unit may be further configured to:
  obtain, from the first control unit, a first memory address associated with a data writing process of the first processing unit;
  receive a read request from the second processing unit, the read request having an associated second memory address; and
  delay execution of the read request based on a comparison of the first memory address and the second memory address.

In an embodiment, the memory region may correspond to a linear buffer or a circular buffer dynamically allocated in the memory unit, and the memory unit may be a shared memory unit with one or more other functional modules of the system.

In an embodiment, the first processing unit may be configured to serve as a data producing unit, and the second processing unit may be configured to serve as a data consuming unit.

In an embodiment, the first processing unit may write data into a guarded writing region in the memory region, and the first memory address may be a starting address of the guarded writing region.

In an embodiment, the second control unit may delay execution of the read request in response to a determination that the second memory address is greater than or equal to the starting address of the guarded writing region.

In an embodiment, the second control unit may determine the guarded writing region based on the first memory address, and the second control unit may delay execution of the read request in response to a determination that the second memory address falls within the guarded writing region.

In an embodiment, the second control unit may delay the execution of the read request by temporarily preventing the second processing unit from reading data from the memory region using the second memory address.

In an embodiment, the first control unit, the second control unit, and the memory unit may be connected to a network on chip through respective interfaces based on a communication protocol, and the memory unit may be accessed by the first processing unit and the second processing via the network on chip and the respective interfaces as controlled by respective control units.

In an embodiment, the first control unit and the second control unit may be connected through a communication link for exchanging memory address information, and the first memory address may be obtained by the second control unit via the communication link.

In an embodiment, the second processing unit may read data from a guarded reading region in the memory region.

In an embodiment, the first control unit may be further configured to: obtain, from the second control unit and via the communication link, a reference memory address associated with the guarded reading region;
  receive a write request from the first processing unit for writing data into the memory region using a memory writing address; and
  delay execution of the write request based on a comparison of the memory writing address and the guarded reading region determined based on the reference memory address associated with the guarded reading region.

In an embodiment, the first control unit may delay execution of the write request based on a determination that the memory writing address falls within the guarded reading region.

In an embodiment, the first control unit may delay execution of the write request by temporarily preventing the first processing unit from writing data into the memory region using the memory writing address.

In an embodiment, the first processing unit may access the guarded writing region using a first memory accessing pattern, and the second processing unit may access the guarded reading region using a second memory accessing pattern different from the first memory accessing pattern.

In an embodiment, the first memory accessing pattern may be a tile-row scanning pattern, and the second memory may access pattern is a raster scanning pattern.

In an embodiment, the first memory accessing pattern and the second memory accessing pattern may be random memory accessing patterns.

In an embodiment, the first processing unit may release memory space of the guarded writing region from a data writing process after the first processing unit has completed writing data into the guarded writing region, and the second control unit may be configured to allow the second processing unit to access the memory space released from the data writing process of the first processing unit.

In an embodiment, the second processing unit may release memory space of the guarded reading region after the second processing unit has completed reading data from the guarded reading region, and the first control unit may be configured to allow the first processing unit to access the memory space released by the second processing unit.

In an embodiment, a method may comprise:
  obtaining, from a first control unit and by a second control unit, a first memory address associated with a data writing process of a first processing unit, the first processing unit being configured to write data into a memory region of a memory unit, the first control unit being configured to control the first processing unit's access to the memory unit;
  receiving, by the second control unit, a read request from a second processing unit, the read request having an associated second memory address, the second processing unit being configured to read data from the memory region of the memory unit, the second control unit being configured to control the second processing unit's access to the memory unit; and
  delaying, by the second control unit, execution of the read request based on a comparison of the first memory address and the second memory address.

In an embodiment, one or more computer-readable non-transitory storage media may embody software that is operable when executed to:
  obtain, from a first control unit and by a second control unit, a first memory address associated with a data writing process of a first processing unit, the first processing unit being configured to write data into a memory region of a memory unit, the first control unit being configured to control the first processing unit's access to the memory unit;
  receive, by the second control unit, a read request from a second processing unit, the read request having an associated second memory address, the second processing unit being configured to read data from the memory region of the memory unit, the second control unit being configured to control the second processing unit's access to the memory unit; and
  delay, by the second control unit, execution of the read request based on a comparison of the first memory address and the second memory address.

In an embodiment, one or more computer-readable non-transitory storage media may embody software that is operable when executed to perform a method according to or within any of the above mentioned embodiments.

In an embodiment, a system may comprise: one or more processors; and at least one memory coupled to the processors and comprising instructions executable by the processors, the processors operable when executing the instructions to perform a method according to or within any of the above mentioned embodiments.

In an embodiment, a computer program product, preferably comprising a computer-readable non-transitory storage media, may be operable when executed on a data processing system to perform a method according to or within any of the above mentioned embodiments.

Particular embodiments described herein relate to systems and methods for efficiently buffering data generated by a data producing unit and consumed by one or more data consuming units. In particular embodiments, the buffer could be a linear buffer (e.g., with a size equal to a frame of data of a video stream). A first memory address (e.g., a write pointer or a position tracker) associated with the guarded writing region of the data producing unit may be sent to a data consuming unit which may determine the guarded writing region based on the first memory address. The control unit associated with data consuming unit may compare the current read pointer to the starting address of the guarded writing region and prevent the data consuming unit from reading from the memory space corresponding to the current read pointer when the current read pointer is equal to or higher than the starting address of the guarded writing region. The data producing unit may release memory space of the guarded writing region after finishing writing data into the guarded writing region. The memory space of the guarded writing region, after being released by the data producing unit, may be accessed by the data consuming unit for reading data from this memory space.

In particular embodiments, the buffer could be a circular buffer which could have a smaller size than a frame size of the buffered video stream. A first memory address (e.g., a write pointer or a position tracker) associated with the guarded writing region of the data producing unit may be sent to a control unit associated with a data consuming unit which may determine the guarded writing region based on the first memory address. The control unit associated with the data consuming unit may compare the current read pointer of the data consuming unit to the address range of the guarded writing region and prevent the data consuming unit from reading from the memory space corresponding to the current read pointer when the current read pointer falls within the address range of the guarded writing region, inclusively. The data consuming unit may release the guarded reading region after finishing reading data from the guarded reading region. The memory space released by the data consuming unit may be recycled and accessed by the data producing unit for writing data into this memory space. A second memory address (e.g., a read pointer) associated with the guarded reading region may be sent to the control unit associated with the data producing unit which may determine the guarded reading region based on the second memory address. The control unit associated with data producing unit may compare the current write pointer of the data producing unit to the address range of the guarded reading region and prevent the data producing unit from writing data into the memory space corresponding to the current write pointer when the current write pointer falls within the address range of the guarded reading region, inclusively. The data producing unit may release the memory space of the guarded writing region after finishing writing data into the guarded writing region. The memory space released by the data producing unit may be accessed by the data consuming unit for reading data from this memory space.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
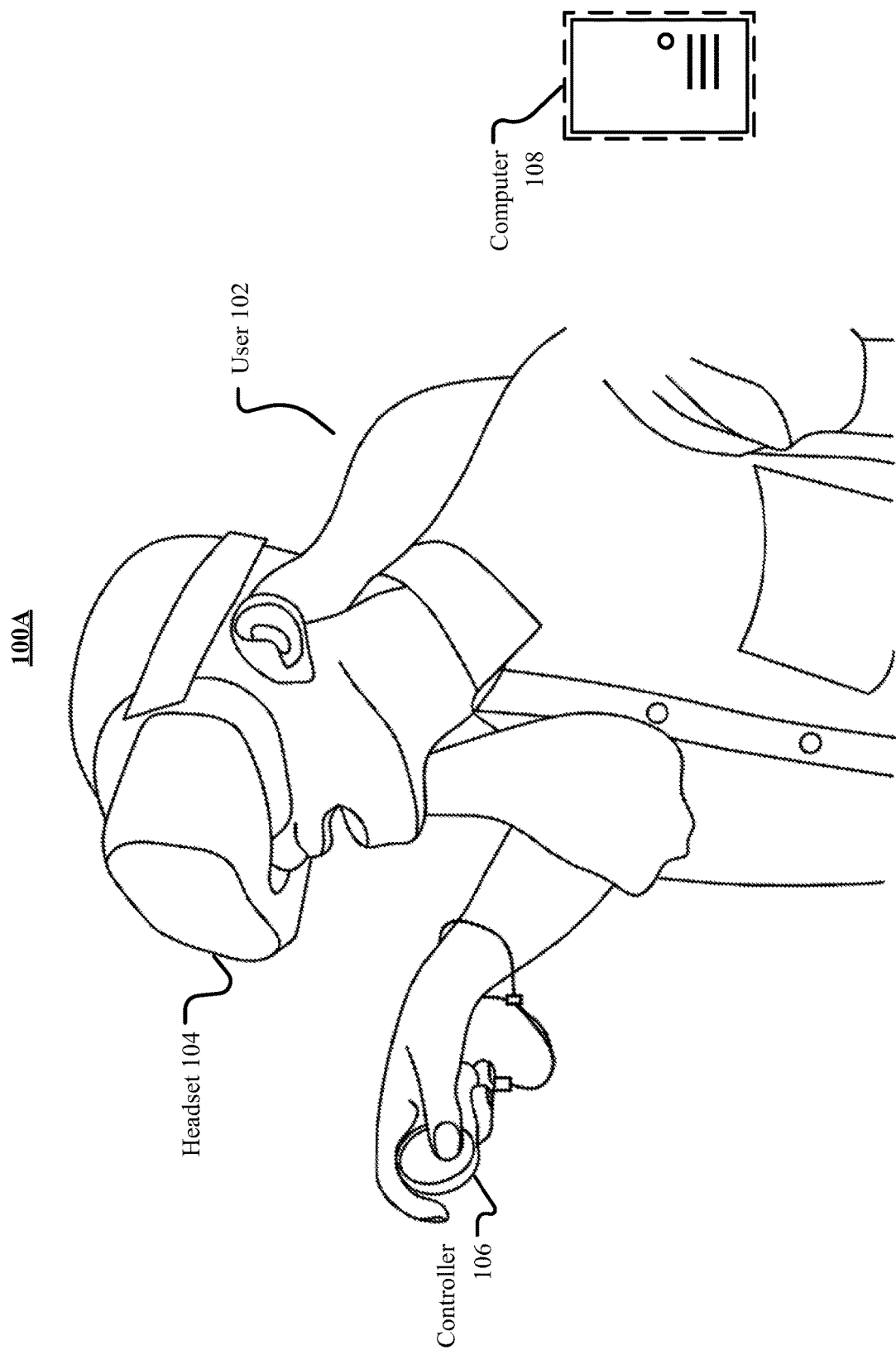
FIG. 1A illustrates an example artificial reality system.

Traditional data buffering solutions such as FIFO may use dedicated memory space with a pre-determined size for buffering data. The input data stream and output data steam may need to be accessed sequentially and in a relatively uniform manner over time to avoid buffer overflow or buffer waste. The data producing unit and data consuming unit may need to work at essentially the same speed for producing and consuming data. These limitations make the traditional buffer solutions unsuitable for data buffering applications that produce/consume data in chunks and access buffer memory at irregular time intervals with irregular memory accessing patterns (e.g., applications such as convolutional neural network accelerators, algorithms running on DSPs and CPUs). Furthermore, other traditional data buffering solutions such as double buffering may need a larger buffer size to buffer data in frames for buffering a video stream. Since the data consuming unit may need to wait the buffer to be filled with frame(s) of data, it would lead to a longer overall execution time for the data producing unit and data consuming unit to generate, buffer, and consume the data. In addition, traditional data buffering solutions such as FIFO and double buffering are unsuitable for applications which need to support multiple data consuming units for accessing the buffered data and need to be easily expandable to support more data consuming units.

Particular embodiments may provide a generic configurable framework for buffering data in a dynamically allocated memory space (rather than dedicated memory space). Particular embodiments may allow the data producing unit to write data into a guarded writing region of the buffer while, concurrently, allow the data consuming unit to read data from a guarded reading region of the buffer. The guarded writing region may be protected/guarded from being accessed by the data consuming unit and the guarded reading region may be protected/guarded from being accessed by the data producing unit. The buffered data may be organized in chucks rather than frames. The data consuming unit may start to access and process data as soon as the data producing unit has generated and buffered a programmable amount of data (e.g., a minimum chunk of data allowing the data consuming unit to work on) and may work concurrently with the data producing unit.

By using the dynamically allocated memory space for data buffering, particular embodiment may allocate memory space as needed based on the data size to be buffered and reduce memory waste and avoid buffer overflow when the data to be buffered has variable sizes. By allowing the data consuming unit to start execution earlier and work concurrently with the data producing unit, particular embodiments may reduce the overall execution time of the data processing pipeline (e.g., generating, buffering, and processing a video stream) and improve the overall efficiency of the system performance. By buffering data in chunks rather than in frames and using circular buffering, particular embodiments may need less memory space for buffering data and reduce the memory footprint of the data buffering process. By using the generic configurable framework, particular embodiments may provide a flexible framework for coordinating data buffering between one or more data producing units and a number of data consuming units and allow the system to be easily expanded to include more data consuming units. By reducing the buffer memory space and the overall execution time, particular embodiments may reduce the power consumption related to the data buffering process.

FIG. 1A illustrates an example artificial reality system 100A. In particular embodiments, the artificial reality system 100A may comprise a headset 104, a controller 106, and a computing system 108, etc. A user 102 may wear the headset 104 that could display visual artificial reality content to the user 102. The headset 104 may include an audio device that could provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 106 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
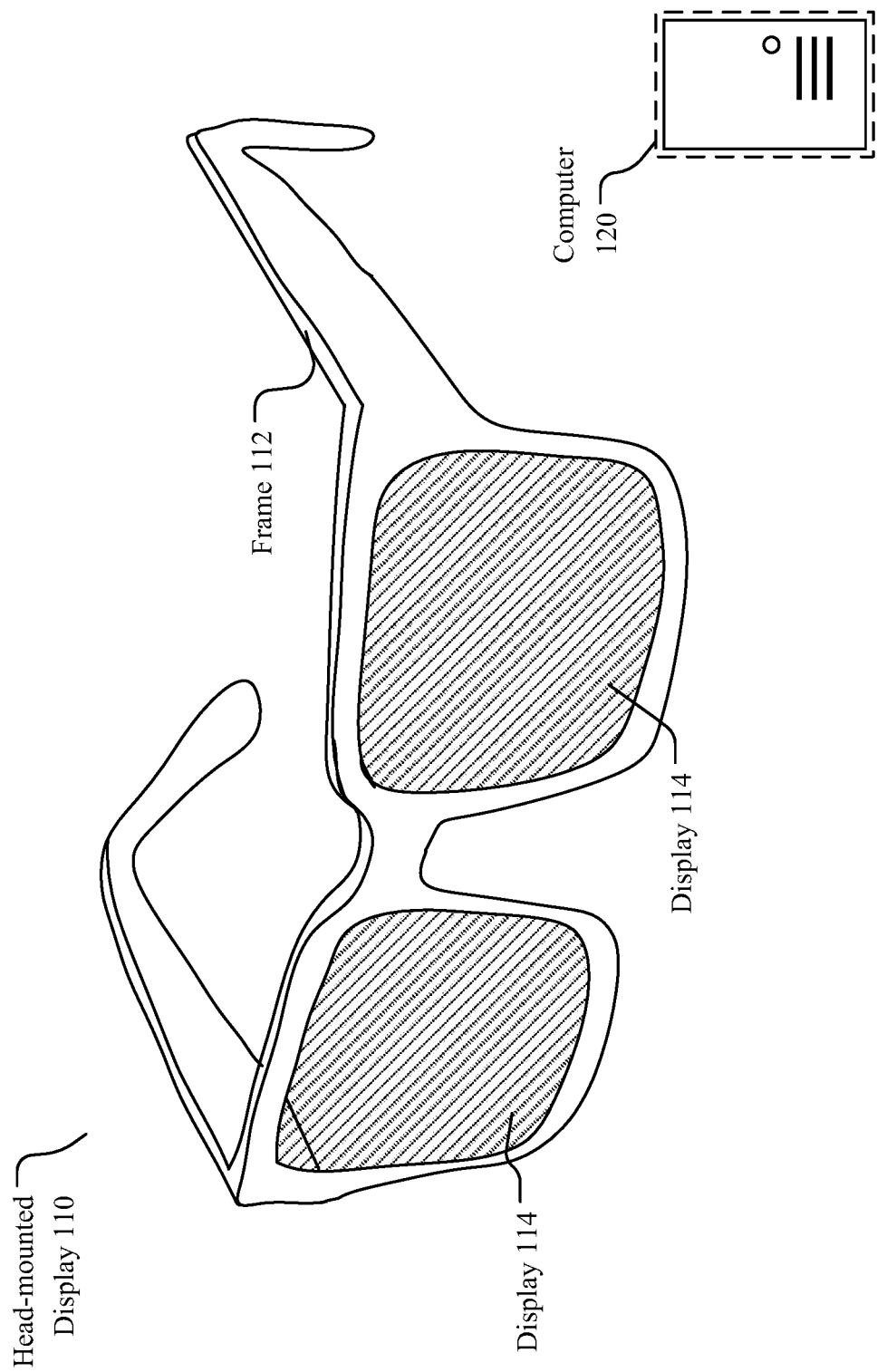
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users. It is notable that the systems, methods, processes, and frameworks as described in this disclosure may be applicable to, but are not limited to, AR/VR systems. The systems, methods, processes, and frameworks as described in this disclosure may be applicable to any systems, devices, or components that need to buffer data.

In particular embodiments, the framework may be a generic configurable framework including a number of distributed control units (also referred to as bridging units or racing control units) for coordinating a data producing unit to share data with one or more data consuming units through a dynamically allocated buffer (e.g., a linear buffer or a circular buffer) in a shared memory unit (rather than in dedicated memory unit). The framework may include a number of control units each being associated with a data producing unit or a data consuming unit. In particular embodiments, the data producing unit and the data consuming unit may be data processing units or any computing units that could generate and/or consuming data. In particular embodiments, a data processing unit (also referred to as a processing unit) could be configurable to serve as a data producing unit or a data consuming unit. The control units may be connected to the shared memory unit through a network (e.g., a network on chip) for transmitting data. The shared memory unit may be accessed by the data producing unit and the data consuming unit through the network and respective control units. The control unit may control the access of the shared memory unit by respective data producing unit and data consuming unit(s). In particular embodiments, the data buffer may be a dynamically allocated memory space within a shared system/local memory (e.g., SOC, SMEM/DRAM) (rather than a dedicated memory unit for data buffering purpose). The shared memory unit may be shared with one or more other functional modules or sub-systems of the system.

In particular embodiments, the data producing unit or data consuming unit may be connected to the respective control units through handshake interfaces and address/data buses. The handshake interfaces may be used to exchange handshake signals (e.g., a valid control signal, a ready status signal) between the respective producing/consuming processing units and corresponding control units. The address/data buses may be used to transmit data and/or address packets between the respective producing/consuming processing units and corresponding control units. The address packets transmitted by the address/data buses may include information related to memory addresses associated with a data writing process of the data producing unit and/or memory addresses associated with a data reading process of a data consuming unit. The control units may determine the relative positions of write/read pointers to respective guarded reading/writing regions (or respective starting addresses of the guarded reading/writing regions) to coordinate the data flow of the data buffer process. The data consuming units may be stalled and re-started later at any time as controlled by the handshake signals (e.g., valid/ready signals) exchanged through the respective handshake interfaces (e.g., to wait for the data producing unit to finish generating the current chunk of data, to start access buffered data when the data is ready for accessing). When the buffer memory has a smaller size than a frame size and is used as a circular buffer, the data producing unit may also need to be stalled and re-started later at any time by the handshake signals (e.g., to prevent overflow by waiting for the data consuming unit to catch up).

In particular embodiments, the control units of the framework may be connected to each other through communication links (e.g., a dedicated links such as, a ring bus, a bidirectional point-to-point link, or a shared interconnect network such as a network on chip) for exchanging memory pointer or memory address information. In particular embodiments, the communication links connecting the control units may be dedicated links for the control units to exchange the memory address information. A control unit pair may exchange read/write pointer information periodically through the communication link. The control units (e.g., associated with a data producing unit or a data consuming unit) may monitor the data writing operations of the data producing unit and the data reading operations of the data consuming unit(s) when these operations fall within the address range assigned to the specific data buffer and control the memory access of the respective data producing/consuming units. In particular embodiments, the control units may control the handshake signals including a valid control signal and a ready status signal based on the relative location of the read/write pointers and respective guarded writing/reading regions to prevent the overflow or underrun states of the buffer memory. For example, the control units may use the handshake signal to avoid overflow of the buffer memory when the buffer size is smaller than the data set to be buffered (e.g., a buffer with a size smaller than a frame size of a video steam). In particular embodiments, the pointer information may be shared by a low bandwidth interfaces associated with the communication links (e.g., a point-to-point link or a ring bus). Using this approach, the framework may not create additional traffic on the existing infrastructure (e.g., a network on chip). In particular embodiments, each control unit may send out its pointer information via periodical writing operations through the network on chip (NoC) to the control status register (CSR) of the corresponding control unit (e.g., a paired control unit or a partner control unit). Using this approach, the framework may leverage the existing NoC infrastructure for coordinating the data buffering process.

In particular embodiments, the framework may support dual producer and consumer functionality for processing units that could be configured to serve as both data producers and data consumers. For example, the framework may configure a processing unit to be data producing unit in a first framework configuration and may configure the same processing unit to be a data consuming unit in a second framework configuration. In particular embodiments, the framework may allow a configuration to include a single data producing unit and one or more data consuming units. In particular embodiments, the control units or bridging units may be implemented as standalone network on chip (NoC) bus bridge units (e.g., AMBA AXI to AMBA AXI bridging units). In particular embodiments, the control units or bridging units may be implemented on or integrated to the processing units (e.g. built into the common logic DMA block of the data producing unit or data consuming unit).

In particular embodiments, the framework may not include control units that are implemented as separate units or chips. Instead, particular embodiments of the framework may have the buffer control functionality (e.g., the functionality of the control units) being implemented within the control mechanisms of the communication network (e.g., a network on chip or a ring bus). As an example and not by way of limitation, a network on chip may have one or more network traffic control modules (or sub-modules) for controlling the network traffic of the communication channel. The framework may leverage these traffic control mechanisms including the network traffic control modules for coordinating data buffering processes. The framework may implement the control logic of the data buffering process (e.g., using guarded write windows and guarded read windows) within the network traffic control mechanisms of the network on chip. As an example and not by way of limitation, a ring bus may have one or more network traffic control modules or sub-modules for controlling the traffic over the ring bus. The framework may implement the control logic of the data buffering process (e.g., using guarded write windows and guarded read windows) within the network traffic control mechanisms of the ring bus. The network control mechanisms may control both the communication network traffic and the data buffering processes of one or more data processing units connected to the network.

By implementing the buffer control logic within the existing network fabric (e.g., control mechanisms of a network on chip or a ring bus), particular embodiments of the framework may have simpler and more flexible architectures by eliminating control units and the dedicated links that connect the control units. The framework may include any number of data processing units (e.g., data producing units or data consuming units) which may be directed connected to the network on chip without intermediate control units. The network on chip may dynamically associate buffer controllers (e.g., buffer control modules or sub-modules within the network control mechanisms) to any data producing units or data consuming units based on their identifiers (rather than physically instantiate and tie a control unit to a specific data processing unit). The framework may allow the data processing units (e.g., data producing units or data consuming units) to exchange the memory address information (e.g., read pointers, write pointers, guarded read windows, guarded write windows, etc.) directly through the network on chip and to coordinate the data buffering process using the guarded write windows and guarded read windows as descripted in this disclosure. By having this flexibility, the framework may allow any agents (e.g., data processing units, control units, micro-controller, DSPs, etc.) connected to the network to use the data buffering mechanisms (e.g., using guarded write windows and guarded read windows) as provided by the framework.

Figure 2A:
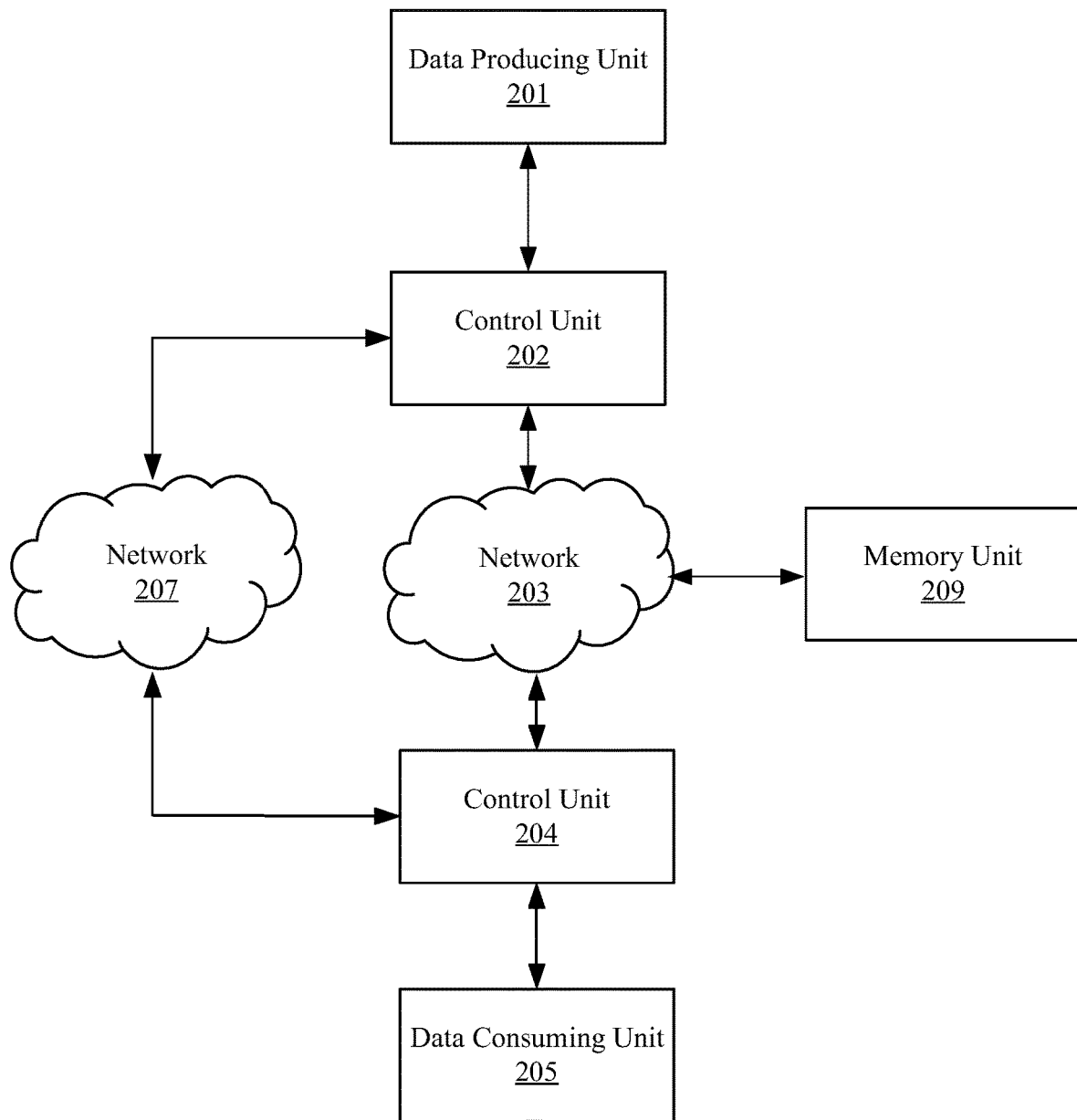
FIG. 2A illustrates an example framework for efficient data buffering.

FIG. 2A illustrates an example framework 200A for efficient data buffering. In particular embodiments, the framework 200A may include a number of distributed control units (e.g., 202, 204) which may be also referred to as bridging units or racing control units), each being associated with a data producing unit (e.g., 201) or a data consuming unit (e.g., 205), for coordinating data buffering between the data producing unit (e.g., 201) and data consuming unit(s) (e.g., 204). As an example and not by way of limitation, a first control unit 202 may be associated with a data producing unit 201 and a second control unit 204 may be associated with a data consuming unit 205. The control units 202 and 204 may be connected to a memory unit 209 through a network 203 (e.g., a network on chip). The data producing unit 201 may generate and write data into the memory unit 209 through the control unit 202 and the network 203. The control unit 202 may control (e.g., delaying, stalling, or re-starting) the access to the memory unit 209 by the data producing unit 201. The data consuming unit 205 may access the memory unit 209 through the control unit 204 and the network 203 for reading data from the memory unit 209. The control unit 204 may control (e.g., delaying, stalling, or re-starting) the access to the memory unit 209 by the data consuming unit 205. In particular embodiments, the control units (e.g., 202, 204) of the framework 200 may be connected by a separate network 207 for exchanging memory address information (e.g., a write pointer, a starting address and/or a size of a guarded writing region, a read pointer, a starting address and/or a size of a guarded reading region) and other information for coordinating the data buffering process. In particular embodiments, the network 207 may be, for example, but is not limited to, a control/status register (CSR) interconnected network. In particular embodiments, the control units (e.g., 202, 204) of the framework 200 may be connected through a communication link (e.g., a point to point link, a ring bus, a control bus) for exchanging the memory address information (e.g., a write pointer, a starting address and/or a size of a guarded writing region, a read pointer, a starting address and/or a size of a guarded reading region) and other information associated with the data buffer process. In particular embodiments, the communication links connecting the control units may be dedicated links for the control units to exchange the memory address information. In particular embodiments, the control units (e.g., 202, 204) of the framework 200 may use the network 203 for exchanging the memory address information (e.g., a write pointer, a starting address and/or a size of a guarded writing region, a read pointer, a starting address and/or a size of a guarded reading region) and other information associated with the data buffer process. Using the memory address information and other information (e.g., exchanged through the network 207 or the network 203 or through a dedicated communication link), the control units (e.g., 202, 204) of the framework 200 may coordinate the data buffering process for passing data from the data producing unit 201 to the data consuming unit 205 through the buffer allocated in the memory unit 209.

In particular embodiments, the framework 200 may be expanded to include more data consuming units. For example, the framework 200 may be expanded by adding additional data consuming units with respective control units which connects the corresponding data consuming units to the network 203. The framework 200 may allow the newly added data consuming units to access the buffered data in the memory 209 through the corresponding control units and the network 203. In particular embodiments, the framework 200 may be configured to have a processing unit to serve as a data consuming unit or a data producing unit and support the data buffering of the re-configured system with no needs for changing the hardware connections. For example, the data producing unit 201 and the data consuming unit 205 may be configured to switch the roles to be a data consuming unit and a data producing unit, respectively, and the framework 200 may use the control unit 201 and 204 to coordinate the data buffering process without any changes in hardware connections. In particular embodiments, a processing producing unit (e.g., 201 or 205) of the framework 200 may serve as a data producing unit and a data consuming unit simultaneously. For example, in one step of a graphic processing pipeline, a data consuming unit may receive and consume data generated by a data producing unit of a former step, while simultaneously produce data for another data consuming unit in a later step of the graphic producing pipeline.

In particular embodiments, the memory unit 209 may be a memory unit shared with one or more other functional modules (e.g. components or sub-systems) of the system (rather than a dedicated memory unit for buffering data). For example, the memory unit 209 could be a SDRAM memory unit shared with one or more CPUs or GPUs of the system. By using a shared memory unit instead of a dedicated memory unit, particular embodiments of the system may avoid adding extra memory units for buffering data and have more optimal memory usage by dynamically allocating buffer memory according to the actual needs (rather than using a buffer memory with a fixed size). In particular embodiments, the system may buffer data in a dynamically allocated memory region in the memory unit 209. The dynamically allocated memory region may be used as a linear buffer or a circular buffer. During the data buffering process, the system may have a dynamical memory footprint for storing the buffered data. The memory footprint used by the system for buffering data may increase when the data producing unit 201 writes data into the buffer and may decrease when the data consuming unit reads data from the buffer.

In particular embodiments, the system may dynamically allocate a memory space in the memory unit 209 for buffering data based on the actual needs of the system. As an example and not by way of limitation, the system may allocate a buffer with a smaller size for buffering smaller data chunks and may avoid wasting memory resources (e.g., avoiding allocating more memory space than the actual needs of the system). As another example, the system may allocate a buffer with a larger size for buffering larger data chunks to avoid buffer overflow when the buffered data chunks have a larger size. By using a dynamically allocated buffer memory with a flexible size, the system may have optimal memory usage by avoiding buffer overflow and reducing buffer memory waste. In particular embodiments, the system may determine the buffer size (and dynamically allocate the corresponding memory space) based on the size of the data chunks (e.g., a frame, a portion of a frame, a surface size, a slice, a tile, a tile row) that need to be buffered. In particular embodiments, the data chunks generated by the data producing unit 201 and buffered in the memory unit 209 may correspond to a frame of a video stream, a portion of a frame, a surface, a slice, a tile, a tile row, one or more lines of pixels, etc. As an example and not by way of limitation, the system may allocate buffer memory corresponding to a frame size and use the allocated buffer memory as a linear buffer for buffering a data chunk corresponding to a frame of data of a video stream. As another example, the system may allocate a memory region corresponding to a portion of a frame (e.g., a tile, a tile row, a slice, a surface, one or more lines of pixels) and use the allocated memory region as a circular buffer for storing a data chunk corresponding to the size of the frame portion (e.g., a tile size, a tile row size, a slice size, a surface, a size corresponding to one or more lines of pixels).

In particular embodiments, the AR/VR systems may include a display engine for generating/rendering the display content. In particular embodiments, the display engine may include one or more graphics applications (e.g., games, maps, content-providing apps, etc.) for rendering the display content based one or more surfaces. The graphic applications may build a scene graph, which is used together with a given view position and point in time to generate primitives to render on a GPU or the display engine. The scene graph may define the logical and/or spatial relationship between objects in the scene. In particular embodiments, the display engine may also generate and store a scene graph that is a simplified form of the full application scene graph. The simplified scene graph may be used to specify the logical and/or spatial relationships between surfaces (e.g., the primitives rendered by the display engine, such as quadrilaterals or contours, defined in 3D space, that have corresponding textures generated based on the mainframe rendered by the application). Storing a scene graph allows the display engine to render the scene to multiple display frames, adjusting each element in the scene graph for the current viewpoint (e.g., head position), the current object positions (e.g., they could be moving relative to each other) and other factors that change per display frame. In addition, based on the scene graph, the display engine may also adjust for the geometric and color distortion introduced by the display subsystem and then composite the objects together to generate a frame. Storing a scene graph allows the display engine to approximate the result of doing a full render at the desired high frame rate, while actually running the GPU at a significantly lower rate.

Figure 2B:
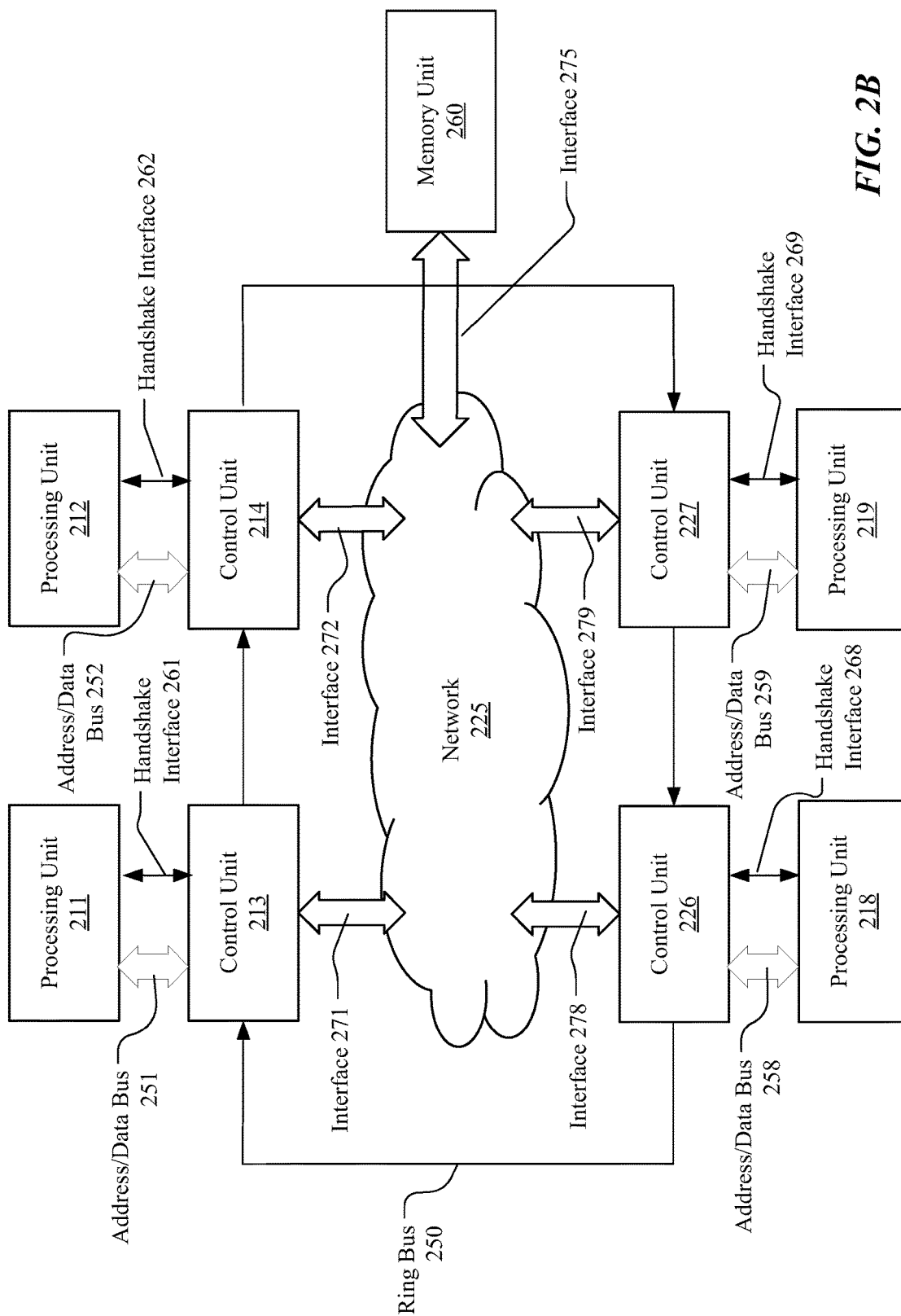
FIG. 2B illustrates an example framework including multiple control units connected by a ring bus.

FIG. 2B illustrates an example framework 210 including multiple control units (e.g., 213, 214, 226, 227) connected by a ring bus 250. As an example and not by way of limitation, the framework 210 may include four processing units 211, 212, 218, and 219 with respective control units of 213, 214, 226, and 227, a network 225, a shared memory unit 260, etc. The control units 213, 214, 226, and 227 may be connected to the respective processing units of 211, 212, 218, and 219 through the respective address/data buses 251, 252, 258, and 259, and the respective handshake interfaces 261, 262, 268, and 269. The handshake interfaces 261, 262, 268, and 269 may be used to exchange handshake signals (e.g., a valid control signal, a ready status signal) between the respective processing unit/control unit pairs. The address/data buses 251, 252, 258, and 259 may be used to transmit data and/or address packets between the respective processing unit and control unit pairs. The control units 213, 214, 218, and 219 may be connected, through respective interfaces of 271, 272, 278, and 279 to the network 225, which may be connected to the memory unit 260. In particular embodiments, the network 225 may be a network on chip (NOC) and the memory unit 260 may be a local memory unit (LMEM) shared with other sub-systems or components (e.g., one or more CPUs or GPUs) of the system. In particular embodiments, the interfaces of 271, 272, 278, and 279 may be advanced extensible interfaces (AXIs). The control units 213, 214, 218, and 219 may be connected through a communication link, which could be a ring bus 250 in this example. The ring bus 250 may be used by the control units 213, 214, 218, and 219 to exchange memory address information for coordinating the data buffering process. In particular embodiments, the information exchanged by the control units 213, 214, 218, and 219 and through the ring buses, may include, for example, but are not limited to, a reference memory address of the buffer memory associated with a buffer writing process of a data producing unit, a starting address of a guarded writing region, an ending address of a guarded writing region, a size of a guarded writing region, a write pointer associated with a current writing address of the buffer memory, a reference memory address of the buffer memory associated with a buffer reading process of the data consuming unit, a starting address of a guarded reading region, an ending address of a guarded reading region, a size of a guarded reading region, a read pointer associated with a current reading address of the buffer memory, etc.

In particular embodiments, the framework 210 may support data buffering between one or more data consuming units and one data producing unit under a particular framework configuration. For the framework 210 including multiple data producing units, the framework 210 may designate one data producing unit as the current data producing unit for the data buffering process. The corresponding control unit of the current data producing unit may be configured to be a ringmaster of the ring bus 250 connecting the control units 213, 214, 226, and 227. The framework 210 may configure a processing unit (e.g., 201, 212, 218, 219) to be a data producing unit or a data consuming unit as needed by the system (with one data producing unit for a particular data buffering process under a particular configuration). As an example and not by way of limitation, each processing unit of 211, 212, 218, and 219 could be configured as a data producing unit or a data consuming unit. For a first framework configuration, the system may configure the processing unit 211 as the current data producing unit for generating and writing data into the buffer memory allocated in the memory unit 260. The system may configure one or more processing units of 214, 218, and 219 as the current data consuming units for reading data from the buffer memory in the memory unit 260. The control unit 213 may be configured to be the ringmaster of the ring bus 250 for controlling the communication of the control units through the ring bus 250. The control units 213, 214, 226, and 227 may communicate with each other through the ring bus 250 for exchanging the memory address information and coordinate the data writing process and the data reading process of the data buffer. For a second framework configuration, the system may configure the processing unit 212 as the current data producing unit and configure one or more processing units of 211, 218, and 219 as the data consuming units. The current data producing unit may generate and write data into the buffer memory allocated in the memory unit 260. The current data consuming units may read data from the buffer memory in the memory unit 260. The control unit 214 may be configured to be the ringmaster of the ring bus 250 for controlling the communication of the control units 213, 214, 226, and 227 through the ring bus 250. The control units 213, 214, 226, and 227 may communicate with each other through the ring bus 250 for exchanging the memory address information and coordinate the data writing process and the data reading process of the data buffer.

As an example and not by way of limitation, the processing unit 211 may be configured to be a current data producing unit and the processing units 212, 218, and 219 may be configured to be current data consuming units. The control unit 213 may be configured to be the ringmaster of the ring bus 250 controlling the communication of the control units through the ring bus 250. Each control units of 213, 214, 218, and 219 may be programed with data structures to store: (1) identifier (ID) addresses or control status register (CSR) addresses for the control unit itself and for the other bridge-partner control units; (2) identical set of addresses that define the start and end of the shared buffer memory; and (3) a memory writing window and a memory reading window within which the data producing unit and data consuming units may access data with any patterns (e.g., tile-row patterns, slice patterns, line patterns, etc.). The ringmaster control unit may further be programed with data structures to store a period of round communication of the ring bus.

In particular embodiments, the control units of the framework may communicate with each other through an interconnect network (e.g., a network on chip). In particular embodiments, the interconnect network may be a dedicated network (e.g., a network on chip) for exchanging memory address information. In particular embodiments, the dedicated network may be a network separate from the network for data transmission. In particular embodiments, the interconnection network may be a shared network (e.g., a network on chip) for both exchanging memory address information and data transmission. In particular embodiments, the data producing unit and data consuming unit may write their pointer values to the corresponding partner unit's CSR.

In particular embodiments, a buffer address may be a 32-bit word. The least significant bit (LSB) of the pointer value may be used as the tag bit. The tag bit may be used to flag the final pointer value at the end of pointer exchange. On the last pointer exchange, each control units may set the LSB value to notify other control units that the pointer exchange operation has completed. On receiving this tag from a producer control unit, the consumer control units may disable their flow-control mechanism. Similarly, the producer control unit may disable its flow-control mechanism upon receiving the tag from consumer control units notifying the producer control unit that the last data package has been processed. In particular embodiments, the producer/consumer control units may flush their final pointer values after performing the last data operation and notify their partner control units that the pointer exchange has been completed. The last pointer exchange may indicate the end-of-frame condition as specified by the communication protocol. For example, the system may use the tag bit (e.g., defined as the least significant bit of the pointer value for exchanges) to indicate the completion of the pointer exchange over a standard NoC. As another example, the system may assign a special bit for a custom protocol to indicate the completion of the pointer exchanges. The end-of-frame "done" signal (e.g. interrupt) generated by the producer unit may directly trigger the "flushing" of the output buffer pointer to consumer after the last data write operation. Alternatively, the last pointer exchange may be triggered by the MCU that controls the producer control units. A similar scheme may be used to flush the last consumer read pointer value. By allowing the control units to disable the flow-control mechanism, the framework may prevent deadlocks in the situation where the amount of data being produced does not match the amount of data being consumed.

In particular embodiments, the control units (also referred to as bridging units) may communicate with each other through the dedicated serial ring bus. The dedicate serial ring bus may eliminate any interference with normal system operations and the serial ring topology may minimize the interconnect overhead. During a data buffering process, the control unit configured to be the ringmaster of the ring bus or any other control units associated with corresponding processing units may work as an active control unit to broadcast memory address information (e.g., a current reading address of the buffer memory of a data consuming unit or a current writing address of the buffer memory of the data producing unit) and a packet ID to all other control units monitoring the ring bus. The packet ID may be used to identify the target control units for receiving memory address information. The target control units that are identified by the packet ID may be the control units included in a valid configuration of the framework for coordinating data buffering processes. A valid configuration of the framework may include a single data producing unit and one or more data consuming units. Each control unit (whether or not they are included in the current valid configuration of the framework) may monitor the packet ID to determine whether that control unit is the intended target control unit included in the current valid configuration. When a control unit identify itself as a receiving control unit as indicated by the packet ID, that control unit may receive the memory address information from the ring bus as broadcast by the active control units.

As an example and not by way of limitation, the processing unit 211 may be configured to be a data producing unit and the processing units of 212, 218, and 219 may be configured to be data consuming units. The data producing unit 211 may exchange handshake control signals (e.g., a valid control signal, a ready status signal) with the control unit 213 through the handshake interfaces 261. The control unit 213 may serve as the ringmaster of the ring bus 250 in this configuration example. The processing unit 211 may generate data and write the generated data into the buffer memory in the memory unit 260 through the data bus 251, the control unit 213, and the interface 271, the network 225, and the interface 275. The data writing process of the processing unit 211 may be associated with a current memory writing address of the buffer memory and a guarded writing region or window of the buffer memory. The guarded writing region of the buffer memory may be guarded/protected from being accessed by data consuming units. The data consuming units 212, 218, and 219 may access the buffer memory in the memory unit 260 for reading data from the buffer memory through the corresponding control units 214, 226, and 227, the network 224, and the corresponding interfaces and data buses. Each data consuming unit (e.g., 212, 218, and 219) may have a current memory reading address which is used by that data consuming unit to read data from a corresponding memory space. In particular embodiments, all current memory reading addresses of the data consuming units may be included in a guarded reading region or window of the buffer memory. The guarded reading region of the buffer memory may be guarded/protected from being accessed by the data producing unit 211.

In particular embodiments, during the data buffering process, the data producing unit 211 may write data into the guarded writing region of the buffer memory while the data consuming units 212, 218, and 219 may read data from the guarded reading region from the buffer memory concurrently. The control unit 213 may broadcast the memory address information related to the current writing address and/or the guarded writing region to other control units 214, 218, and 219 through the ring bus 250. The control units 214, 218, and 219 may compare their read pointers to the current writing address and/or the guarded writing region each time the corresponding processing units attempt to read from the shared buffer memory. The control units 214, 218, and 219 may delay reading requests of the corresponding data consuming unit by temporarily preventing/stalling the corresponding data consuming units 212, 218, and 219 from accessing the guarded writing region in the buffer memory when the current read pointer exceed the starting address of the guarded writing region or falls within the guarded reading region. In particular embodiments, the control units 214, 218, and 219 may account for the specified window margin to decide whether to pass or delay the corresponding reading requests to the network 224, or to stall the unit until the requested data becomes available. The control units 214, 218, and 219 may send the respective memory address information relate to the respective current reading address and/or the reference addresses of respective guarded reading regions of the data consuming unit to the control unit 213. The control unit 213 may compare the corresponding write pointer of the associated data producing unit to the memory reading addresses associate with the guarded reading region of the data consuming units 214, 218, and 219, and delay corresponding write requests by temporarily preventing/stalling the data producing unit 211 from accessing the guarded reading region of the buffer memory when the write pointer exceeds the starting address of the guarded reading region or falls within the guarded reading region.

In particular embodiments, the dynamically allocated buffer memory may be used as a circular buffer which may be accessed by more than one data consuming units. In particular embodiments, the multiple data consuming units may have a shared guarded reading region from which each data consuming unit may be allowed to read data with any suitable patterns. The control unit 213 of the data producing unit 211 may aggregate information from all data consuming units, determine the shared guarded reading region, and prevent the data producing unit from accessing the shared guarded reading region of the data consuming units. In particular embodiments, each data consuming unit of the multiple data consuming units may have a separate guarded reading region from which that data consuming unit reads data. The data control unit 213 of the data producing unit 211 may only communicate with the control unit of the slowest data consuming unit, determine the corresponding guarded reading region, and prevent the data consuming unit from accessing the buffer memory space exceeding the starting address of or falling with the guarded reading region of the slowest data consuming unit.

In particular embodiments, the framework may allow multiple data producing units to work concurrently to provide data for one or more data consuming units. In particular embodiments, a data producing unit that feeds more than one data consuming units may aggregate the read pointers from all data consuming units and select the worst-case value (e.g., the smallest read pointer value) of all the data consuming units. In particular embodiments, when multiple data producing units drive a single data consuming unit, the data consuming unit may use the worst case writer pointe value (e.g., the smallest write pointer value) of all the data producing units. As an example and not by way of limitation, two concurrent camera sensors may produce a left image and a right image (side-by-side) and feed these two images to a video encoder. The video encoder may use the smallest write pointer value of the two camera sensors for coordinating the data buffering process.

In particular embodiments, the framework may allow the data producing units and the data consuming units to be agnostic about the shared-buffer mechanism as descripted in this disclosure. The framework may allow the data producing/consuming units to work in the same ways as if writing or reading from the full size buffer corresponding the full data size to be buffered (e.g., a whole frame). The memory transactions may cover the full address range of the full size buffer even though the actual buffer might be a fraction of that full address range. To take advantage of the smaller shared-buffer size to reduce the physical memory footprint, the framework may locate the shared buffer outside the physical range and have the control units to remap the virtual addresses to an actual location in physical memory. The data producing/consuming units may be programmed with the virtual buffer address ranges. Each control unit may map the virtual addresses to the physical address as seen in the local memory map. In particular embodiments, the data producing/consuming units may issue memory transactions that are not aligned or are not in a usual multiple of bytes. The AXI protocol may stipulate that AXI-compliant clients and may not issue burst transactions that cross a 4 Kbyte address boundary. To prevent issues with buffer rollover, the framework may cause the circular buffer to be aligned on a 4 Kbyte boundary and to have a size that is multiple of 4 Kbytes.

In particular embodiments, the pointer exchanges may be performed asynchronously by control units of the framework with the same or different update rates. A higher the rate may lead to a better control granularity with higher pointer exchange bus traffic. In particular embodiments, the framework may select an update period that is much smaller (e.g. <5%) than the operation execution time. In particular embodiments, the framework may cause each control unit to send out its pointer information via periodical NoC write operations to its partner control unit's CSR. In particular embodiments, pointer information may be shared via a dedicated low bandwidth link (e.g., point-to-point or a ring bus). In particular embodiments, the framework may exchange pointer information leveraging the existing NoC infrastructure. The control units may have a master interface to the CSR NoC, or may be able to issue periodical write transactions to transfer pointers interleaved with normal AXI master outgoing traffic. The additional NoC traffic may be accounted for at high update rates. As an example and not by way of limitation, the framework may include two control unit pairs exchanging pointers per micro second. The transaction may generate 64 MB/s of equivalent NoC if done over a 128-bit AXI data bus or 16 MB/s on the 32-bit CSR NoC. The transaction traffic may be reduced by reducing the pointer exchange rate. In particular embodiments, the framework may use a bidirectional point-to-point serial interface or a dedicated serial ring bus for exchanging pointer information.

In particular embodiments, the framework may be used for buffering intermediate data of a data pipeline (e.g., video and image compression-related intermediate data storage) using a single buffer region of the memory unit (without using the double-buffer). As an example and not by way of limitation, the framework may include a data processing unit (e.g., a video encoder of a graphic pipeline) which is configured to be a data producing unit and a data consuming unit concurrently. The video encoder may process every input frame and generate an encoded frame based on the input frame. In the meantime, the video encoder may generate a reconstructed reference frame during the encoding process of every frame. The video encoder may store the reconstructed reference frame in a buffer and read the stored reconstructed reference frame in the buffer when encoding a later frame or in a later frame processing step. Traditionally, the video encoder of a data processing pipeline may use a double-buffer for buffering the intermediate data (e.g., the reconstructed reference frame). For example, the video encoder may write the intermediate data of a prior encode process into a first buffer of a double-buffer. Then, the video encoder may write the intermediate data of a current encode process into a second buffer of the double buffer while reading the stored intermediate data of the prior encode process from the first buffer. Since the double-buffer mechanism needs a buffer memory size of no less than two full frames, traditional methods of using double-buffer may require more memory space.

In particular embodiments, by using the framework as described in this disclosure, the video encoder may buffer the intermediate data (e.g., the reconstructed reference frames) in a single buffer region of a memory unit without using the double-buffer. The video encoder may be connected to the memory unit by an associated control unit via an AXI interface port and a network (e.g., a network on chip). The video encoder may generate a reconstructed reference frame during the encoding process of every frame. The video encoder may store the reconstructed reference frame into a buffer region of the memory unit as controlled by the associated control unit. For example, the associated control unit may write data of a portion of the reconstructed reference frame into the buffer region in a guarded writing window which is protected from being accessed for data reading operations. In the meantime, the video encoder may read a portion of a reconstructed reference frame of a prior encode process from a guarded reading window which is protected from being accessed by data writing operations. The intermediate data including the reconstructed reference frames may be transmitted (e.g., for writing into and reading from the buffer region) through the single AXI interface port which connects the associated control unit (which is connected to the video encoder) to the network connected to the memory unit. As a result, the framework may allow the intermediate data of the video encoder to be buffered in a single buffer region without using double-buffer. Since the reconstructed reference frames are written into and read from the buffer region in data packages corresponding to a portion of a frame and having a smaller size than the full frame size, the single buffer region may have a size smaller than two full frame size (e.g., slightly larger than one full frame size). As a result, by using the framework, the video encoder may reduce the memory footprint for buffering the reconstructed reference frames (e.g., from two full frame size to slightly larger than one frame size).

Figure 2C:
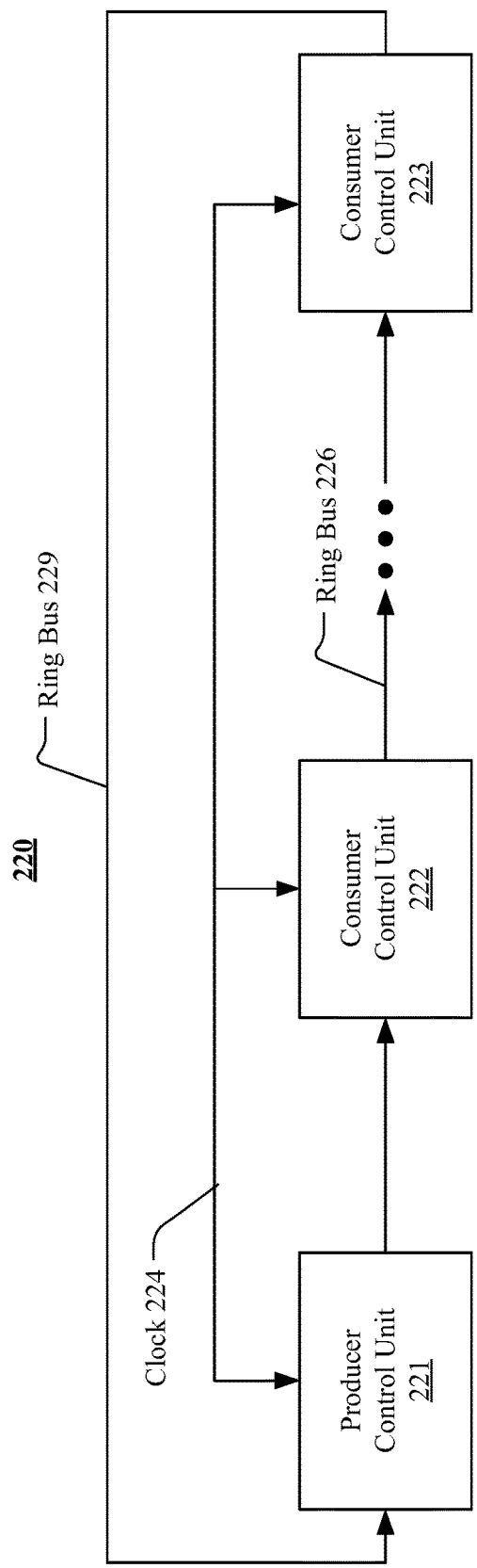
FIG. 2C illustrates an example framework including a single producer control unit and multiple consumer control units connected by a ring bus.

FIG. 2C illustrates an example framework 220 including a single producer control unit 221 and multiple consumer control units (e.g., 222, 223) connected by a ring bus 229. As an example and not by way of limitation, the framework 220 may include a single producer control unit 231 (e.g., associated with a corresponding data producing unit) and a number of consumer control units (e.g., 222, 223) (e.g., associated with respective data consuming units). The producer control unit 231 and consumer control units (e.g., 232, 233) may be connected through a unidirectional two-wire ring bus 226, which may use a serial communication protocol. The serial communication protocol may use an AXI (advanced extendable interface) clock 224 being fed to each control unit (e.g., 221, 222, 223). The serial communication protocol may use a first wire of the two-wire bus as the start-bit wire for packet synchronization and use the second wire for transferring data payload. In particular embodiments, the ring bus 226 may be a time domain multiplexing (TDM) token-ring bus where each control unit may get a time slot to communicate with other control units. In particular embodiments, the data packet being transmitted using the serial communication protocol and two-wire ring bus may include, for example, but are not limited to, a valid bit for tag packets that carry a payload, two or more ID bits to address the unit that owns the time slot (e.g., ID=0 is reserved for the producer control unit), 32 payload bits b0-b31 that carry the 32-bit read pointer or write pointer memory address, a tag bit to flag the last pointer transfer, an optional parity bit, etc. In particular embodiments, the producer control unit 221 may serve as the ring bus "master" and circulate packets including valid bit 0, ID bits, and slots with unassigned values (i.e., empty slots) through the ring bus at a programmable frequency. Each consumer unit (e.g., 222, 223) may receive the packet from the ring bus 226 and monitor the ID in the packet. When the ID matches its own ID, the consumer unit may replace the null payload with the read pointer value of the corresponding data consuming unit, and set the valid bit before forwarding the packet to the next node on the ring. In particular embodiments, valid payloads with ID=0 may carry the producer write pointer and non-zero IDs may carry consumer read pointers. In particular embodiments, when more than one independent consumer are present, the producer control unit 221 may collect one set of inputs from all the consumer units before updating its internal read pointer with the minimum value of the set.

Figure 2D:
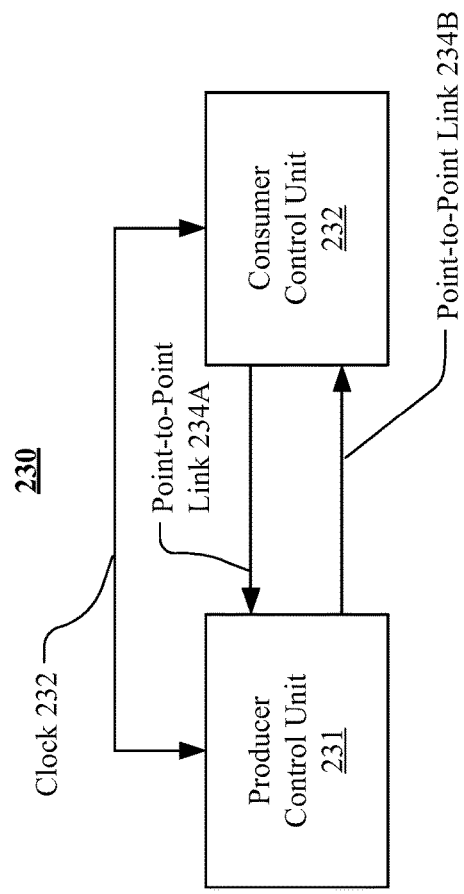
FIG. 2D illustrates an example framework including a single producer control unit and a single consumer control unit connected by a point-to-point link.

FIG. 2D illustrates an example framework 230 including a single producer control unit 231 and a single consumer control unit 232 connected by a point-to-point link. As an example and not by way of limitation, the framework 230 may include a single producer control unit 231 and a single consumer control unit 232 which are connected through dedicated point-to-point links 234A and 234B for the control units to exchange pointer information for coordinating the data buffering process. The point-to-point links 234A and 234B may include two bidirectional or unidirectional wire links or two unidirectional two-wire links. The producer control unit 231 and consumer control unit 232 may use a serial communication protocol and the AXI clock 232 for communicating with each other. The serial communication protocol may use a first wire for transmitting the start bit for packet synchronization and use the second wire for transmitting data packet. The packet payload may include a 32-bit memory address (e.g., a read pointer or a write pointer) and a tag bit. The packet play load may further include an optional parity bit which could be appended to the packet to improve link robustness.

Figure 2E:
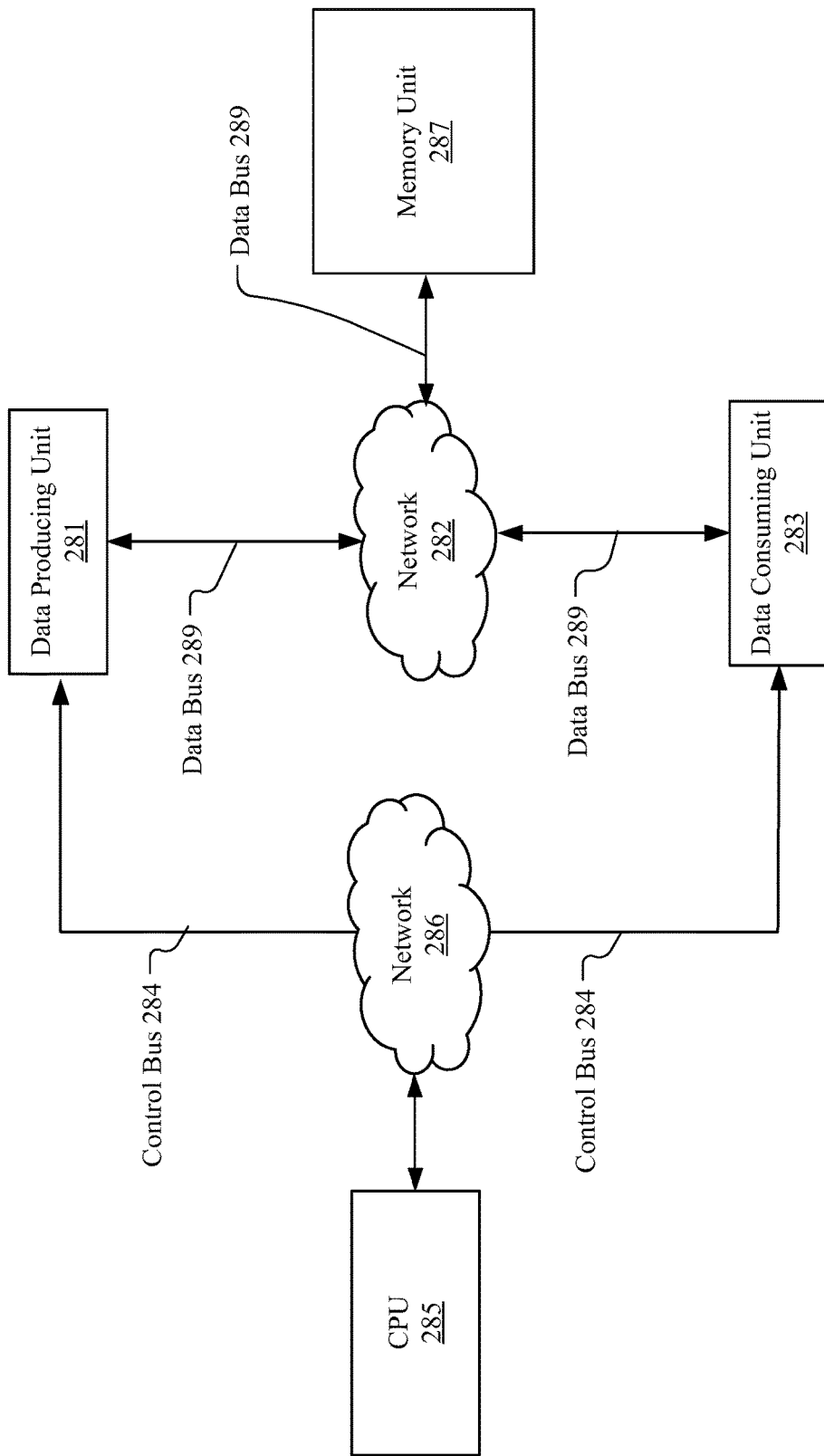
FIG. 2E illustrates an example framework for coordinating data buffering without distributed control units.

FIG. 2E illustrates an example framework 240 for coordinating data buffering without distributed control units. In particular embodiments, the systems, methods, and processes as described in this disclosure may be implemented without using distributed control units or bridging units. As an example and not by way of limitation, the framework 240 may include a data producing unit 281, a data consuming unit 283, a shared memory unit 287, a CPU 285, etc. The data producing unit 281, the data consuming unit 283, and the shared memory unit 287 may be connected by a first network 282 (e.g., a network on chip) through the data bus 289. The data producing unit 281, the data consuming unit 283, and the CPU 285 may be connected by a second network 286 (e.g., a network on chip) through a control bus 284. The data producing unit 281 may generate data and write data into a guarded writing region in the buffer memory of the shared memory unit 287. The guarded writing region may be guarded/protected from being accessed by the data consuming unit 283. The data consuming unit 283 may access and read data from a guarded reading region in the buffer memory of the shared memory unit 287. The data producing unit 281 and the data consuming unit 283 may exchange memory address information (e.g., a write pointer, a starting address of a guarded writing region, a read pointer, a starting address of a guarded reading region, etc.) for coordinating the data writing and reading processes of the buffer memory through the control bus 284 as controlled by the CPU 285. The data consuming unit 283 may compare its current read pointer to the guarded writing region of the data producing unit 281 and may avoid accessing the guarded writing region. The data producing unit 281 may compare its current write pointer with the guarded reading region of the data consuming unit 283 and may avoid accessing the guarded reading region of the data consuming unit 283. By using the framework 240, the systems, methods, and processes as descripted in this disclosure may implemented without using the distributed control units.

In particular embodiments, the system may allow a data producing unit to generate and write data into a guarded writing region of the buffer and allow one or more data consuming units to concurrently read data from a guarded reading region of the buffer. The guarded writing region may be prevented from being accessed by the data consuming units and the guarded reading region may be prevented from being accessed by the data producing unit. Within the guarded writing region, the data producing unit may write data with any suitable memory accessing pattern (e.g., a raster scanning pattern, a tile-row scanning pattern, a slice scanning pattern, or a random accessing pattern). Within the guarded reading region, the data consuming units may read data with any suitable memory accessing pattern which cloud be the same to or different from the memory accessing pattern used by the data producing unit.

As an example and not by way of limitation, a data producing unit may generate and write data into a guarded writing region in the buffer while the data consuming units read data from a guarded reading region of the buffer concurrently. A first control unit associated with the data producing unit may send a first memory address (e.g., a current write pointer address or a starting address of the guarded writing region) to one or more control units associated with the data consuming units. The control units associated with the data consuming units may determine the guarded writing region of the buffer based on the first memory address and prevent the corresponding data consuming units from accessing the guarded writing region of the buffer. The control units associated with data consuming units may send one or more second memory addresses, associated with the data reading processes of the data consuming units, to the first control unit associated with the data producing unit. The first control unit may determine the guarded reading region of the buffer based on the second memory address and prevent the data producing unit from accessing the guarded reading region. The data producing unit may access the guarded writing region of the buffer using a raster scanning pattern, a tile-row scanning pattern, a slice scanning pattern, or a random accessing pattern. The data consuming units may access the guarded reading region using a pattern which could be the same to or different from the memory accessing pattern of the data producing unit. The data consuming units may start to read data from buffer, as soon as the data producing unit generates a programmable amount of data (e.g., a minimum chunk of data allowing the data consuming unit to work on), without waiting for the data producing unit to finish generating all data (e.g., a whole frame) for the current step of execution of the data processing pipeline. By using distributed control units, the framework could reduce the memory footprint of the buffer for sharing data and reduce the total execution time of the data producing unit and data consuming units.

Figure 3A:
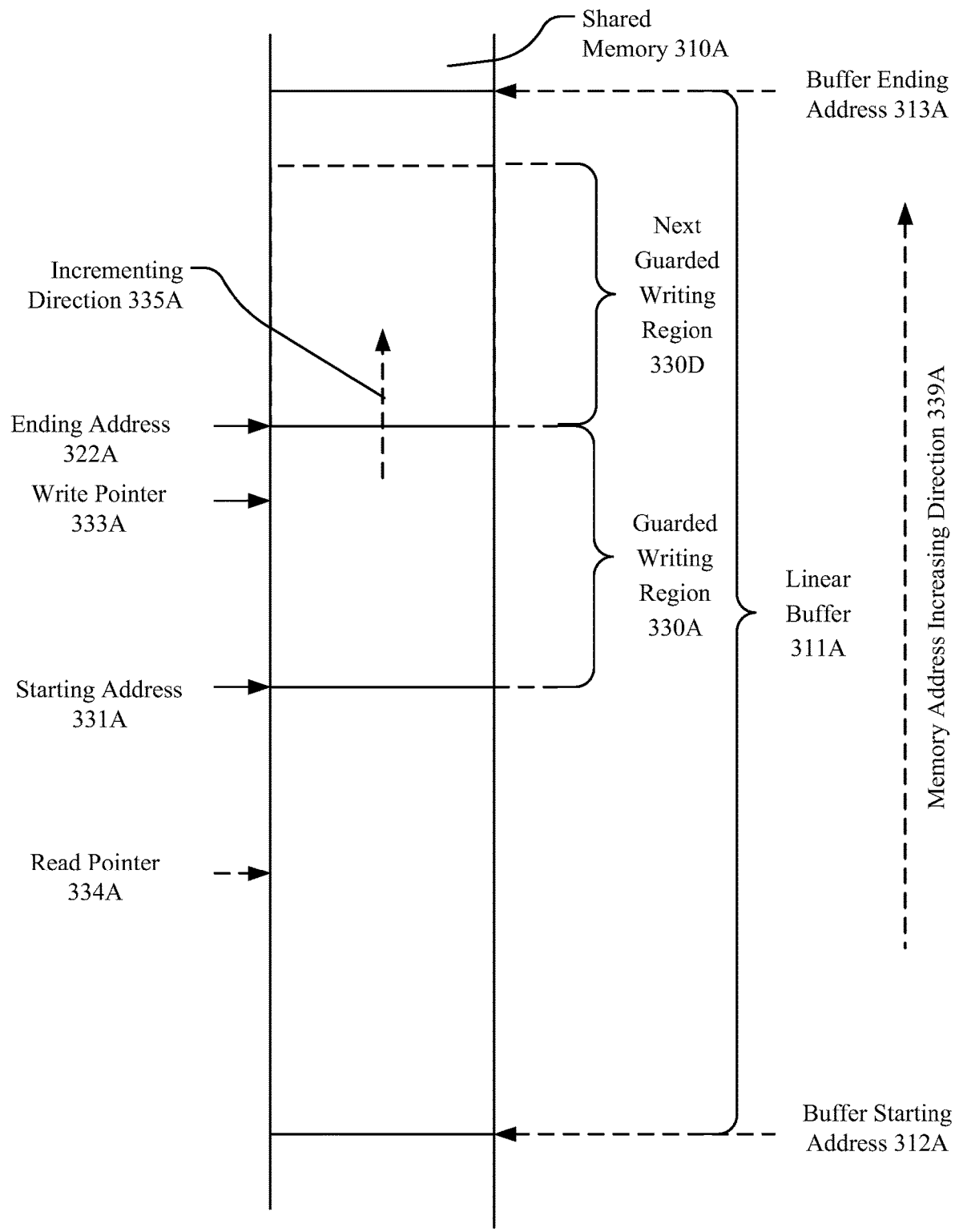
FIG. 3A illustrates an example process for buffering data using a linear buffer with a guarded writing region.

FIG. 3A illustrates an example process 300A for buffering data in a linear buffer 311A with a guarded writing region 330A. In particular embodiments, the system may dynamically allocate a memory region in the shared memory unit and use the allocated memory region as a linear buffer for buffering data. The guarded writing region 330A (also referred to as guarded writing window) may be a sub-region or a window of memory blocks in the buffer memory. The guarded writing region or window 330A may include one or more memory blocks in the buffer memory corresponding to the dynamically allocated region. As an example and not by way of limitation, the linear buffer 311A may correspond to a dynamically allocated memory region in the shared memory 310A. The linear buffer 311A may have a buffer starting address 312A and a buffer ending address 313A and the memory address values may increase along the direction 339A from the buffer starting address 312A to the buffer ending address 313A. In particular embodiments, the linear buffer 311A may have a predetermined size based on the size of the data to be buffered. As an example and not by way of limitation, for buffering a frame of data of a video stream, the linear buffer 311B may have a size corresponding a frame size of the video stream.

In particular embodiments, a data producing unit may generate and write data into a guarded writing region 330A in the linear buffer 311A. The data writing operations may be performed through an associated control unit and a network (e.g., a NoC) connecting the data control unit and the shared memory unit. The control unit associated with the data producing unit may store a position tracker (e.g., a starting address, an ending address, or a reference address) associated with the guarded writing region 330A and may allow the data producing unit to write data into the guarded writing region 330A. The guarded writing region 330A may have a starting address 331A and an end address 322A. The data producing unit may write data into any memory space within the guarded writing region 330A. The data producing unit may write data into the guarded writing region 330A using a write pointer 333A pointing to a current writing address which is between the starting address 331A and the ending address 322A of the guarded writing region 330A. The write pointer 333A used by the data producing unit may move within the guarded writing region 330A with any pattern (e.g., a random pattern) or in any order during the data writing process which allows the data producing unit to write data into the guarded writing region 330A with any pattern or in any order (e.g., a random pattern or a random order). In particular embodiments, one or more data consuming units may read data from the linear buffer 311A through respective associated data control units and the network (e.g., a NoC) connecting the data control units and the shared memory unit. The respective control units may coordinate the corresponding data reading processes of the data consuming units.

In particular embodiments, the guarded writing region 330A may have a pre-determined size based on the size of the data chunk (e.g., a tile size, a slice size, or a data chunk size) to be buffered. In particular embodiments, the guarded writing region 330A may have a programmable size as determined dynamically based on the size of the data chunk (e.g., a tile size, a slice size, or a data chunk size) to be buffered. For writing data into the circular buffer 311B, the guarded writing region 330A may increment from the starting address 312A to the ending address 313A of the buffer region during the data writing process. Each incremental step may correspond the size of the guarded writing region 330A. After the producing unit has finished writing data into the current guarded writing region 330A, the current guarded region 330A may be disabled with the corresponding memory space being released from the data writing process. The memory space after being released from the data writing process may be accessible by the data consuming units for reading data. The current guarded writing region 330A may increment along the incrementing direction 335A to the next guarded region 330D which may have a starting address equal to the ending address 322A of the current guarded writing region 330A. The guarded writing region after incremented may have the same size with the former guarded writing region. The incrementing process of the guarded writing region may be repeated until the data producing unit finishes writing data into the linear buffer 311A. During the incrementing process of the guarded writing region, the control unit associated with the data producing unit may store an updated position tracker associated with the incremented guarded writing region and allow the data producing unit to writing data to the incremented guarded writing region.

In particular embodiments, while the data producing unit writes data into the guarded writing region 330A, one or more data consuming units may read data from the linear buffer 311A during a data reading process concurrent to the data writing process of the data producing unit. The data consuming units may access the buffer memory through the associated control units and the network (e.g., a NoC) connecting the control units to the shared memory unit in which the linear buffer 311A is allocated. The data consuming units may send data reading requests to the associated control units which may coordinate and manage the data reading operations by executing or delaying the data reading requests based on the comparison of the read pointer and the guarded writing region 330A. The control unit associated with the data producing unit and the control units associated with the data consuming units may be connected by a communication link (e.g., a ring bus, a point-to-point link, a network) for exchanging the memory address information for coordinating the data buffering process. During the data buffering process, a first memory address associated with the guarded writing region 330A of the data producing unit may be sent from the control unit associated with data producing unit to a control unit associated with a data consuming unit through the communication link. In particular embodiments, the first memory address associated with the guarded writing region 330A could be, for example, but are not limited to, a write pointer 333A, a starting address 311A of the guarded writing region 330A, an ending address 322A of the guarded writing region 330A, a center address of the guarded writing, or any reference address associated with the guarded writing region 330A. In particular embodiments, other information (e.g., a size of the guarded writing region 330A) may also be sent from the control unit of the data producing unit to the control units of the data consuming units through the communication link that connect the control units.

After receiving the first memory address associated with the guarded writing region 330A, the control unit associated with the data consuming unit may determine the guarded writing region 330A based on the received first memory address and other information (e.g., the size of the guarded writing region 330A). The control unit and associated data consuming units may use information (e.g., the starting address 311A and the ending address 322A) related to the guarded writing region 330A for coordinating the data reading processes of the data consuming units from the linear buffer 311A. The control unit associated with the data consuming unit may compare the current read pointer 334A of the data consuming unit to the starting address 311A of the guarded writing region 330A and prevent or stall the data consuming unit from reading from the memory space when the current read pointer 334A is equal to or higher than the starting address 311A of the guarded writing region 330A.

In particular embodiments, the data consuming unit may read data from any memory space between the buffering starting address 312A and the starting address 311A of the guarded writing region with any memory accessing pattern (e.g., a raster scanning pattern, a tile-row scanning pattern, a linear pattern, a random pattern, or any suitable patterns). In particular embodiments, the data producing unit may write data into the buffer memory with a data writing speed slower than the data reading speed of the data consuming data for reading data from the buffer memory. When the data consuming unit has finished reading data from the readable memory region (e.g., from buffer starting address 312A to the starting address 331A of the guarded writing region 330A), the data consuming unit may be stalled for reading data to wait for the data producing unit to finish writing data into the current guarded writing region 330A. After the data producing unit has finished writing data into the current guarded writing region 330A, the guarded writing region 330A may increment toward the buffer ending address 313A and release the just-finished guarded writing region to allow the data consuming unit to read data. The data producing unit may generate a trigger signal (e.g., an interrupt signal) when the data is ready for reading and send the trigger signal the control unit of the data consuming unit to trigger the data consuming unit to resume the data reading process. When the data producing unit has finished writing data to the linear buffer 311A, the data producing unit may release the last guarded writing region and allow the data consuming units to access any memory space within the linear buffer 311A.

In particular embodiments, multiple data consuming units may read data from the buffer memory in a data reading process concurrent to the data writing process of the data producing unit. During the data buffering process, information associated with the guarded writing region 330A (e.g., a writer pointer 333A, a starting address 311A of the guarded writing region 330A) of the data producing unit may be broadcast through the communication link to multiple control units associated with multiple data consuming units. Each control unit of the corresponding data consuming unit may determine the guarded writing region 330A based on the received information and compare the corresponding read pointer to the starting address 331A of the guarded writing region 330A. When the read pointer of a data consuming unit reaches or exceeds the starting address 311A of the guarded writing region 330A, the corresponding data consuming unit may be stalled by the associated control unit from reading data from the memory space pointed by the read pointer. The data consuming units may resume the data reading process for reading data when the data producing unit has finished writing data into the guarded writing region and released the guarded writing region.

Figure 3B:
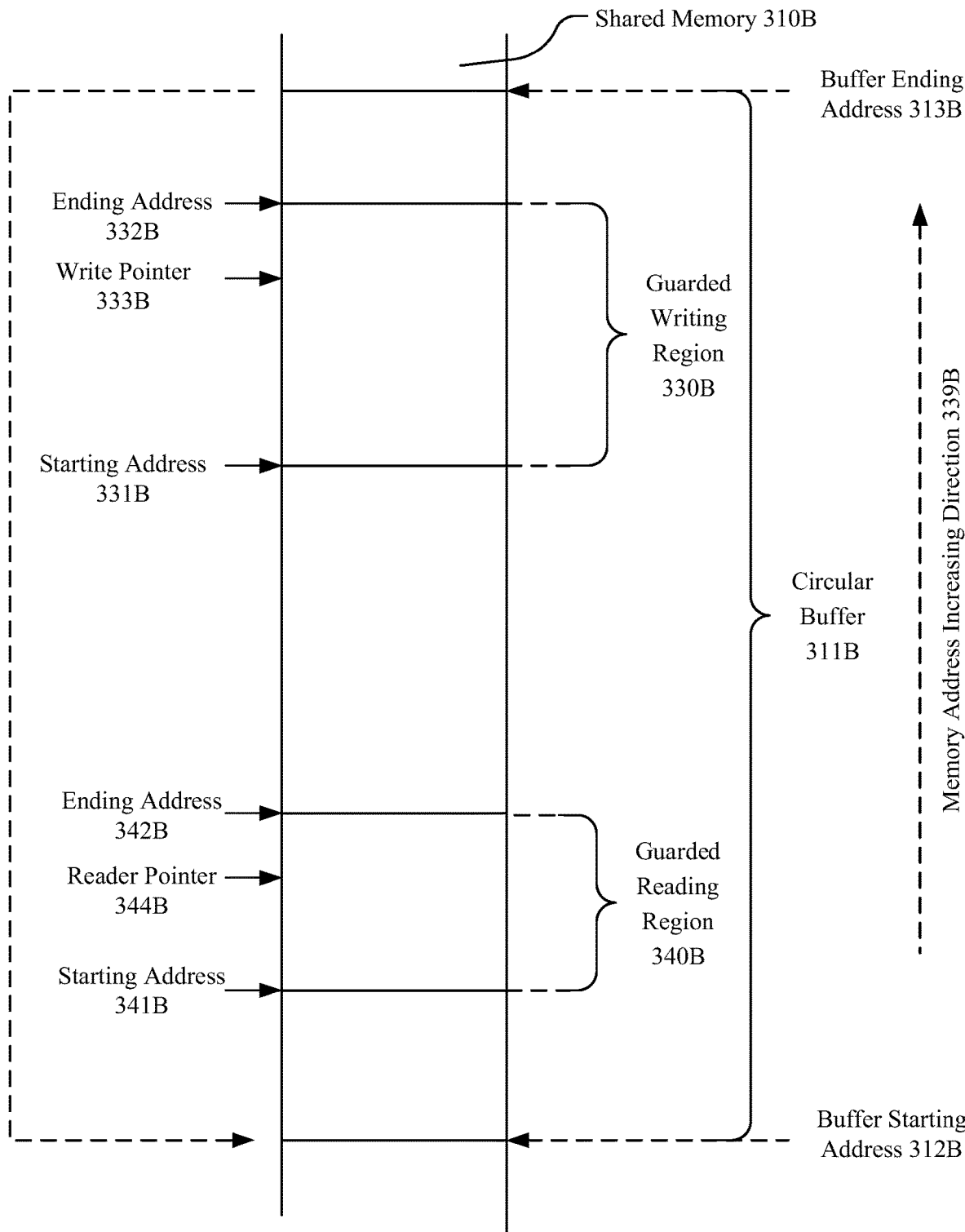
FIGS. 3B-3C illustrate an example process for buffering data using a circular buffer with guarded writing/reading regions.
Figure 3C:
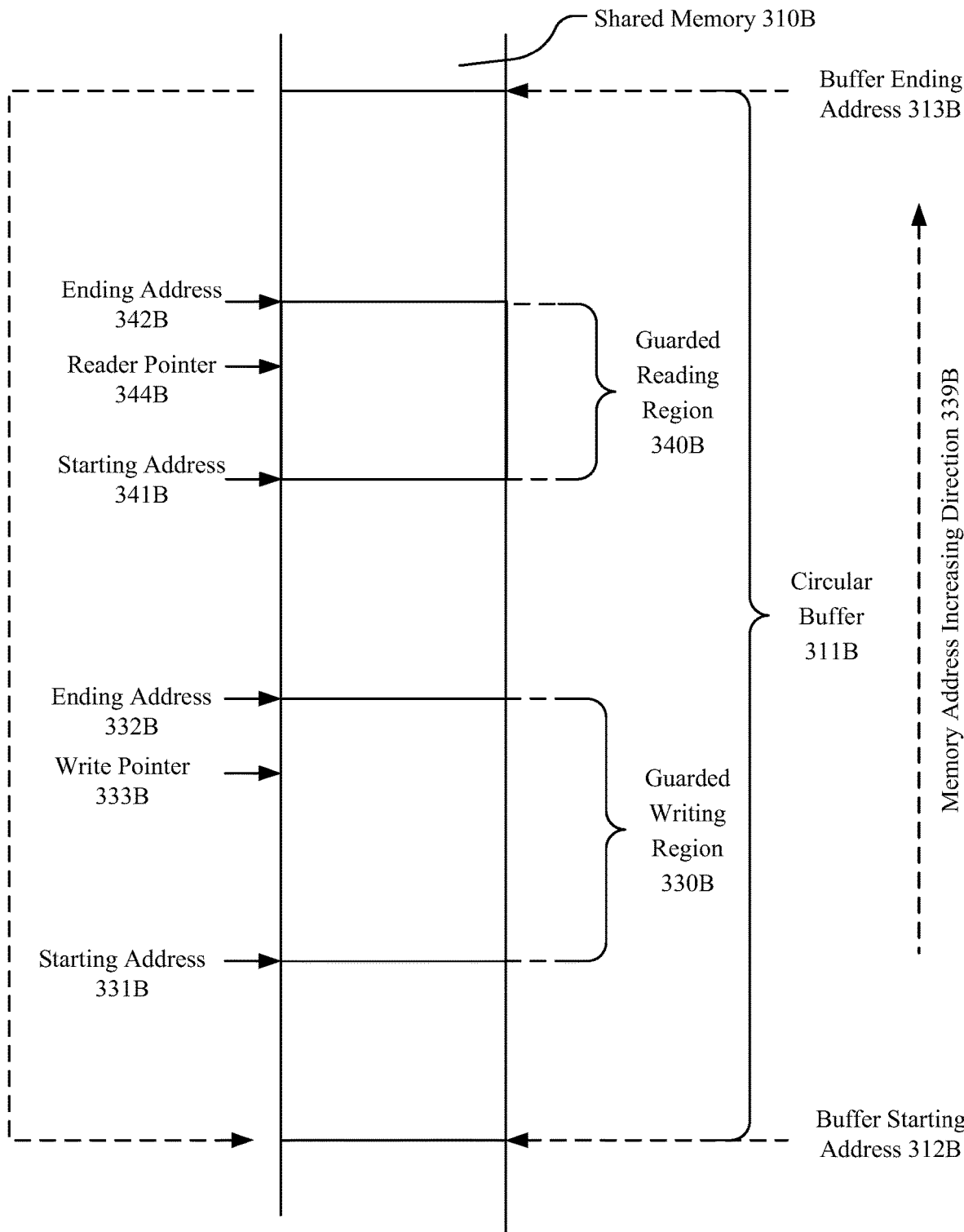

FIGS. 3B-3C illustrate an example process for buffering data using a circular buffer 311B with guarded writing/reading regions (e.g., 330B, 340B). In particular embodiments, the buffer memory dynamically allocated in the shared memory 310B may be used as a circular buffer instead of a linear buffer. In particular embodiments, the circular buffer 311B may have a smaller size than the frame size of the video stream to be buffered since the memory space of the circular buffer 311B may be re-used in a circular manner for during a data buffering process. In particular embodiments, a data producing unit may generate and write data into the circular buffer 311B using a write pointer 333B within a guarded writing region 330B through an associated control unit. The data writing operations may be performed through the associated data control unit and a network (e.g., a NoC) connecting the data control unit and the shared memory 310B. The control unit associated with the data producing unit may store a position tracker (e.g., a starting address, an ending address, or a reference address) associated with the guarded writing region 330B and may allow the data producing unit to write data into the guarded writing region 330B. The guarded writing region 330B may be guarded/protected from being accessed by data consuming units which read data from the circular buffer 311B. The guarded writing region 330B may be incremented along the memory address increasing direction 339B from the buffer starting address 312B to the buffer ending address 313B. When the guarded writing region 330B reaches the end (e.g., the ending address 313B) of the circular buffer 311B, the guarded writing region 330B may be incremented to the starting portion (e.g., corresponding to the buffering starting address 312B) of the circular buffer 311B if the buffer memory the starting portion of the circular buffer 311B has been released from the data reading process(es) and is ready to be recycled for writing data.

In particular embodiments, one or more data consuming units may read data from the guarded reading region 340B of the circular buffer 311B during a data reading process concurrent to the data writing process of the data producing unit. The guarded reading region 340B may be guarded/protected from being accessed by the data producing unit. The data reading processes may be performed through respective data control units and the network (e.g., a NoC) connecting the data control units and the shared memory unit. The control units associated with the data consuming units may receive data reading requests from the corresponding data consuming units and may execute or delay the reading requests based on comparison of the corresponding read pointers with the guarded writing region 330B.

In particular embodiments, the data producing/consuming units may access the memory space within the guarded writing region using any memory accessing patterns. In particular embodiments, the data producing unit may access the guarded writing region of the buffer using a raster scanning pattern, a tile-row scanning pattern, a slice scanning pattern, or a random accessing pattern. In particular embodiments, the data consuming unit may access the guarded reading region of the buffer using a raster scanning pattern, a tile-row scanning pattern, a slice scanning pattern, or a random accessing pattern. The data consuming units may access the guarded reading region using a pattern which could be the same to or different from the memory accessing pattern of the data producing unit. As an example and not by way of limitation, the guarded writing region 330B may have a starting address 331B and an end address 322B. The data producing unit may write data into any memory space within the guarded writing region 330B. The data producing unit may write data into the guarded writing region 330B using a write pointer 333B pointing to a current writing address which is between the starting address 331B and the ending address 322B of the guarded writing region 330B. The write pointer 333B used by the data producing unit may move within the guarded writing region 330B with any pattern (e.g., a random pattern) during the data writing process which allows the data producing unit to write data into the guarded writing region 330B with any pattern and in any order (e.g., a random pattern or a random order).

In particular embodiments, the data consuming unit may access the memory space within the guarded reading region using any memory accessing patterns. As an example and not by way of limitation, the guarded reading region 340B may have a starting address 341B and an end address 342B. The data consuming units may read data from any memory space within the guarded reading region 340B. The data consuming units may read data from the guarded reading region 340B using respective read pointers (e.g., the read pointer 344B) which are between the starting address 341B and the ending address 342B of the guarded reading region 340B. The read pointer 344B used by the data consuming unit may move within the guarded reading region 340B with any pattern (e.g., a random pattern) during the data reading process which allows the data consuming units to read data from the guarded reading region 340B with any pattern and in any order (e.g., a random pattern or a random order).

In particular embodiments, the guarded writing region 330B may have a pre-determined size based on the size of the data chunk (e.g., a tile size, a tile-row size, a slice size, a size corresponding to one or more lines of pixels, a data chunk size) of the buffered data. In particular embodiments, the guarded writing region 330B may have a programmable size as dynamically determined based on the size of the data chunk (e.g., a tile size, a tile-row size, a slice size, a size corresponding to one or more lines of pixels, a data chunk size) of the buffered data. During the process for writing data into the circular buffer 311B, the guarded writing region 330B may increment from the starting address 312B to the ending address 313B of the buffer region. After the data producing unit has finished writing data into a current guarded writing region 330B, the current guarded region 330B may be disabled for data writing with the corresponding memory space being released from the data writing process. The memory space that is released from the data writing process may be accessible by the data consuming units for reading data. The current guarded writing region 330B may increment along the memory address increasing direction 339B to a next guarded region whose starting address may equal to the ending address of the current guarded writing region 330B. The incrementation of the guarded writing region 330B may be repeated during the data writing process. When the guarded writing region 330B reaches the end (e.g., the ending address 313B) of the circular buffer, the guarded writing region 330B may increment to the start portion (e.g., corresponding to the buffer starting address 312B) of the circular buffer if the memory space of the start portion has been released from related data reading processes of the data consuming units and is ready for being recycled for data writing. In particular embodiments, the guarded reading region 340B may have a predetermined size or a dynamically determined size based on the size of the data chunk (e.g., a tile size, a tile-row size, a slice size, a size corresponding to one or more lines of pixels, a data chunk size) of the buffered data. In the particular embodiments, the size of the guarded reading region 340B may be larger than, smaller than, or equal to the size of the guarded writing region 330B depending on the actual application needs. During the data reading process, the guarded reading region 340B may increment from the starting address 312B to the ending address 313B of the circular buffer 311B. After the data consuming unit has finished reading data from a current guarded reading region 340B, the current guarded region 340B may be disabled for data reading operations with the corresponding memory space being released from the data reading process. The memory space after being released from the data reading process may be accessible by the data producing unit and may be recycled for allowing the data procuring unit to write data. The current guarded reading region 340B may increment along the memory address increasing direction 339B to a next guarded reading region which may have a starting address equal to the ending address 342B of the current guarded reading region 340B. The incrementation of the guarded reading region 340B may be repeated during the data reading process. When the guarded reading region 340B reaches the end (e.g., the ending address 313B) of the circular buffer, the guarded reading region 330B may increment to the start portion (e.g., corresponding to the buffer starting address 312B) of the circular buffer if the memory space of the start portion has been filled with data and is ready for reading data (e.g., being released from related data writing process of the data producing unit).

In particular embodiments, during the data writing/reading process of the circular buffer 311B, the guarded writing region 330B and the guarded reading region 340B may have different relative positions depending the state of the data writing/reading process. As an example and not by way of limitation, FIG. 3B illustrates an example state 300B where the guarded writing region 330B is ahead of the guarded reading region 340B. As another example, FIG. 3C illustrates an example state 300C where the guarded writing region 330B is behind the guarded reading region 340B. In particular embodiments, to prevent a data consuming unit from accessing the guarded writing region 330B, the control unit associated with that data consuming unit may allow or delay execution of a read request from that data consuming unit based on a comparison of the read pointer and the memory address range (e.g., including both the starting address 331B and the ending address 332B) of the guarded writing region 330B. Similarly, to prevent the data producing unit from accessing the guarded reading region 340B, the control unit associated with the data producing unit may allow or delay execution of a write request from that data producing unit based on a comparison of the write pointer and the memory address range (e.g., including both the starting address 341B and the ending address 342B) of the guarded reading region 330B.

In particular embodiments, while the data producing unit writes data into the guarded writing region 330B, one or more data consuming units may read data from the guarded reading region 340B during a data reading process concurrent to the data writing process. The data consuming units may access the buffer memory through the associated control units and the network (e.g., a NoC) connecting the control unit to the shared memory unit in which the circular buffer 311B is allocated. The data consuming units may send read requests to the associated control units which may coordinate and manage the data reading operations by executing or delaying the read requests based on the comparison of the reader pointer and the guarded writing region 330B. The control unit associated with the data producing unit and the control units associated with the data consuming units may be connected by a communication link (e.g., a ring bus, a point-to-point link, an interconnect network) for exchanging the memory address information (e.g., position trackers of the guarded writing/reading region) for coordinating the data buffering process.

During the data buffering process, a first memory address associated with the guarded writing region 330B of the data producing unit may be broadcast to all data consuming units through the communication link. A control unit associated with a data consuming unit may receive the first memory address through the communication link. In particular embodiments, the first memory address associated with the guarded writing region 330B may be, for example, but is not limited to, a write pointer 333B, a starting address 311B of the guarded writing region 330B, an ending address 322B of the guarded writing region 330B, a center address of the guarded writing region 330B, a reference address associated with the guarded writing region 330B, or any position trackers associated with corresponding guarded writing region 330B. In particular embodiments, other information (e.g., a size of the guarded writing region 330B) may also be broadcast by the control unit associated with the data producing unit through the communication link and sent to the control units of the data consuming units for coordinating the data buffering process.

During the data buffering process, a second memory address associated with the guarded reading region 340B of the data consuming unit may be sent to the control unit associated with the data producing unit through the communication link. The control unit associated with the data producing unit may receive the second memory address through the communication link. In particular embodiments, the second memory address associated with the guarded reading region 340B could be, for example, but is not limited to, a read pointer 344B, a starting address 341B of the guarded reading region 340B, an ending address 342B of the guarded reading region 340B, a center address of the guarded reading region 340B, a reference address associated with the guarded reading region 340B, or any position tracker associated with the guarded reading region 340B. In particular embodiments, other information (e.g., a size of the guarded reading region 340B) may also be sent by the control unit associated with the data reading unit to the control unit of the data producing unit through the communication link for coordinating the data buffering process.

After receiving the first memory address associated with the guarded writing region 330B, the control unit associated with a data consuming unit may determine the guarded writing region 330B based on the received first memory address and other information (e.g., the size of the guarded writing region 330B). The control unit associated with the data consuming unit may compare the current read pointer of the data consuming unit to the starting address 331B and the ending address 332B of the guarded writing region 330B and may prevent the data consuming unit from reading data from the memory space corresponding to the current read pointer if the current read pointer falls within the range of the guarded writing region 330B. The control unit associated with the data consuming unit may delay execution of reading requests received from the associated data consuming unit in response to a determination that the current read pointer falls within the guarded writing region 330B. The control unit may temporally stall the data consuming unit from reading data from the memory space corresponding to the current reader pointer and may allow the data consuming unit to resume the data reading process when the corresponding memory space has been filled with data and is ready for data reading (e.g., after being released from the data writing process). In particular embodiments, the data consuming unit may be allowed to read data from any memory space in the circular buffer 311B that is filled with buffered data by the data producing unit and is ready for being access for data reading (e.g., being released from the data writing process of the data producing unit).

In particular embodiments, the data producing unit may write data into the buffer with a data writing speed slower than a speed at which the data consuming data reads data from the buffer. When the data consuming unit has finished reading data from all memory space in the buffer which the data consuming unit is allowed to access, the data consuming unit may be stalled for reading data to wait for the data producing unit for writing data into the buffer. After the data producing unit has finished writing data into the current guarded writing region 330B, the guarded writing region 330B may increment toward the buffer ending address 313B (or may be circled back to the starting portion of the buffer) and release the just-finished guarded writing region to allow the data consuming unit to read data. The data producing unit may generate a trigger signal (e.g., an interrupt) when the data is ready for reading and send the trigger signal the control unit of the data consuming unit to trigger the data consuming unit to resume the data reading process. When the data producing unit has finished writing the whole data chuck (e.g., a tile, a tile row, a slice, one or more lines of pixels) to be buffered in the circular buffer 311B, the data producing unit may release the last guarded writing region and allow the data consuming units to access any memory space within the linear buffer 311B.

In particular embodiments, multiple data consuming units may read data from the circular buffer 311B in a data reading process which is concurrent to the data writing process of the data producing unit. During the data buffering process, information (e.g., a position tracker, a starting address, an ending address, or a reference address) associated with the guarded writing region 330B may be broadcast through the communication link to the control units associated with the data consuming units. Each data consuming unit may determine the guarded writing region 330B based on the received information and compare its read pointer to the starting address 331B and the ending address 332B of the guarded writing region 330B. When the read pointer of a data consuming unit falls within the guarded writing region 330B, the corresponding data consuming unit may be stalled by the associated control unit from reading data from the memory space pointed by the read pointer. The control unit may delay execution of the read requests of the corresponding consuming unit by temporally stalling the data reading process of the data consuming unit. The data consuming units may be configured by the associated control unit to resume the data reading process for reading data when the data producing unit has finished writing data into the guarded writing region 300B and released the guarded writing region 300B from the data writing process.

In particular embodiments, multiple data consuming units may have their read pointers being contained within the same guarded reading region whose information (e.g., a position tracker, a starting address, an ending address, a reference address, a size) may be sent to the control unit of the data producing unit (through the communication link) for the data producing unit to avoid accessing the guarded reading region. In particular embodiments, multiple data consuming units may each have a guarded reading region from which that data consuming unit reads data. In this situation, in particular embodiments, the information (e.g., position trackers, starting addresses, ending addresses, reference addresses, sizes) related to the frontmost and behind most guarded reading regions may be sent to the control unit of the data producing unit for coordinating the data buffering process. The data consuming unit with the frontmost guarded reading region may be prevented from accessing the guarded writing region of the data producing unit. The data producing unit may be prevented from accessing the behind most guarded reading region. In particular embodiments, information related to each guarded reading region may be sent to the control unit of the data producing unit for coordinating the data buffering process. The data producing unit may be prevented from accessing each and every guarded reading region of the data consuming units. Each data consuming unit may be prevented from accessing the guarded writing region of the data producing unit.

In particular embodiments, the framework may allow a data producing unit to write data into the buffer in a quasi-sequential order or a sequential order that may match one of the following memory access patterns including, for example, but not limited to, a raster scanning order, a tile-row scanning order, a slice-by-slice scanning order, etc. As an example and not by way of limitation, the data producing unit may use a tile-row scanning order for writing data into the buffer. The individual tiles in a row may be written in any order and any suitable memory accessing pattern (e.g., a random order). As another example, the data producing unit may use a slice-by-slice scanning order for writing data into the buffer memory, the individual items (e.g., pixels) in a slice may be written into the buffer memory in any order (e.g., a random order). In particular embodiments, the framework may allow a data consuming unit to read data from the buffer using a different memory accessing pattern from the memory accessing pattern used by the data producing unit for writing data into the buffer. In particular embodiments, the data consuming unit may access the memory using a same memory accessing pattern to the memory accessing pattern used by the data producing unit for writing data into the buffer.

In particular embodiments, the buffer size corresponding to the dynamically allocated memory region in the shared memory unit may be determined based on the data size to be buffered. For example, a linear buffer to store one frame image (e.g., of a video stream) may have the buffer size equal to the size of one frame of image. As another example, a circular buffer for buffering image data may have a smaller size than one frame of image (e.g., half size of a frame of image or any size corresponding to a portion of a frame image) since the memory space of the circular buffer may be recycled during the data buffer process. In particular embodiments, the size of the guarded writing region may be determined based on the size of corresponding data chunk (e.g., a tile, a tile row, a slice, one or more raster scanning lines, etc.) to be written to the buffer. In particular embodiments, the size of the guarded reading region may be determined based on the size of corresponding data chunk (e.g., a tile, a tile row, a slice, one or more raster scanning lines, etc.) to be read from the buffer. In particular embodiments, the size of the guarded reading region may be different from or the same to the size of the guarded reading region depending on the sizes of the data chunks to be written into and read from the buffer.

Figure 4:
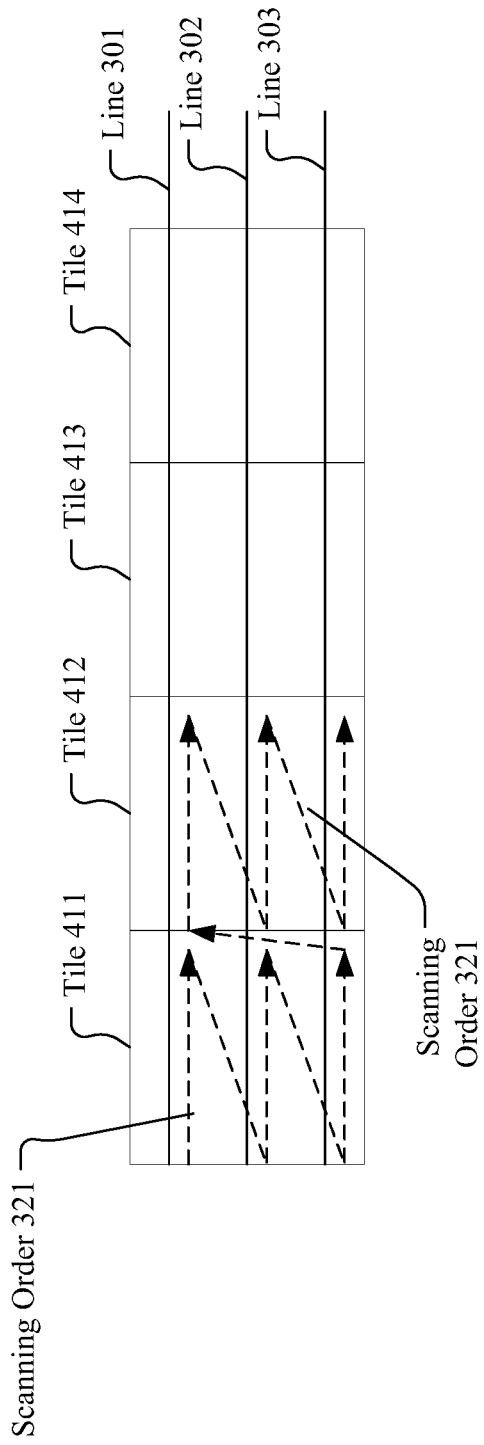
FIG. 4 illustrates example memory accessing patterns for writing data into and reading data from a circular buffer.

FIG. 4 illustrates example memory accessing patterns 400 for writing data into and reading data from a circular buffer. As an example and not by way of limitation, the data producing unit may write data (through the corresponding control unit and the network on chip) into the buffer using a tile-row scanning order, as illustrated in FIG. 4. To be buffered in the circular buffer which has a buffer size smaller than a frame of image, a frame of image to be buffered may be divided into a number of portions with each portion corresponding to a tile row. The guarded writing region used by the data consuming unit for writing data into the buffer may have a size corresponding to a tile row of one frame of image. The associated control unit may store a position tracker of the guarded writing region and coordinate the data producing unit to write data only into the guarded writing region. Within the guarded writing region, the individual tiles in the tile row may be written in any order. For example, the individual tiles may be written tile by tile in an order (e.g., 411, 412, 413, 414) from the first tile 411 of the tile row toward the end of the tile row. As another example, the individual tile of the tile row may be written in any tile order (e.g., a random tile order) within the guarded writing region corresponding to the tile row.

Within each tile, the data producing unit may write data of that tile (e.g., 411, 412) using the scanning order 321 as illustrated in FIG. 4. The data producing unit may first write data of a first line of that tile (e.g., 411, 412), and then move to next line of the same tile until the data of the whole tile has been completed. The data producing unit may repeat the data writing process tile by tile in the tile row until all tiles of the entire tile row have been finished. After finishing writing a tile row, the control unit associated with the data producing unit may release the guarded writing region from the data writing process and iterate to next guarded writing region for next tile row. The memory space that has been filled with data and has been released from the data writing process may be accessible by the data consuming units for reading data. It is notable that the scanning order 321 as shown in FIG. 4 is for example purpose only and the scanning order or memory accessing pattern of the data producing unit within the guarded writing region) is not limited thereof. The scanning order or memory accessing pattern of the data producing unit within the guarded writing region could be any suitable patterns or orders, for example, a line order, a random order or pattern, etc.

In particular embodiments, the data consuming unit may read data from the buffer using a memory accessing pattern which could be the same to or different from the memory accessing pattern used by the data producing unit for writing data into the buffer. When the guarded writing region corresponding to tile row has been filled with data and released from the data writing process, the corresponding memory space may be ready for the data consuming unit to read data from. The data consuming unit may read data from the buffer within a guarded reading region. As an example and not by way of limitation, the guarded reading region may correspond to the size of a tile row. The data consuming unit may read data line by line in any order or any memory accessing pattern from the guarded reading region until finishing read all the data of the tile row. Then, the guarded reading region may be incremented to a next guarded reading region if the corresponding memory space has been filled with data and is ready to be read by the data consuming unit. As another example, the guarded reading region may correspond to a raster line of the image frame. The data consuming unit may read data from the buffer line by line. Within each line, the data consuming unit may read the pixels of that raster line in any order or any memory accessing pattern. After reading all the pixels of the raster line, the guarded reading region may be incremented to a next guarded region if the corresponding memory space has been filled with data and is ready to be accessed by the data consuming unit.

In particular embodiments, a frame of image to be buffered may be divided into a number of slices. Each slice may correspond to a chunk of data corresponding to a portion of image that could be independently encoded or decoded by the data processing units. A slice of image may have a rectangular boundary to fit in a rectangular image frame and may have any suitable size. In particular embodiments, the data producing unit may write data into the buffer using a slice-by-slice order. The circular buffer may be a dynamically allocated memory space having a size corresponding to a number of slices. The data producing unit may write data into a guarded writing region corresponding to a size of a slice. Within the guarded writing region, the data producing unit may write data in any order or with any memory accessing pattern. After completion of writing a slice, the current guarded writing region may be released from the data writing process and may be incremented to a next guarded writing region. The memory space that has been filled with a slice and released from the data writing process may be accessed by the data consuming unit from reading data.

In particular embodiments, the data consuming unit may read data from the circular buffer using a same pattern to or a different pattern from the data writing process of the data producing unit. As an example and not by way of limitation, the data consuming unit may read data from the buffer in a slice-by-slice order. The data consuming unit may read data from a guarded reading region having a size corresponding to a slice of image. Within the guarded reading region, the data consuming unit may read data with any suitable pattern and in any order (e.g., a line-by-line order, a random order, etc.). After the completion of reading a slice, the guarded reading region may be released from the data reading process and may be incremented to a next guarded reading region. As another example, the data consuming unit may read data from the buffer in a line-by-line order. The data consuming unit may read data from a guarded reading region having a size corresponding to a line of image. Within the guarded reading region, the data consuming unit may read data with any suitable pattern and in any order (e.g., a pixel-by-pixel order, a random pixel order, etc.) After the completion of reading a line, the guarded reading region may be released from the data reading process and may be incremented to a next guarded reading region. When the data consuming unit reads data in a slice-by-slice order, the guarded reading region may have the same size (corresponding to a slice) to the guarded writing region. When the data consuming unit reads data in a line-by-line order, the guarded reading region may have a smaller size (corresponding to a line of pixels) than the guarded writing region's size (which correspond to a slice of a frame of image).

In particular embodiments, both the data producing unit and the data consuming unit may write data into the buffer and read data from the buffer using a same line-by-line order. In this situation, the guarded writing region and the guarded reading region cloud have a small size corresponding to a line of pixels. In particular embodiments, both the data producing unit and the data consuming unit may write data into the buffer and read data from the buffer using a same tile-by-tile order. In this situation, the two dimensional pixels array within each time may be flattened into one dimensional pixel arrays allowing the data producing unit and data consuming unit to read data following the order as determined by the one dimensional pixel array. The guarded writing region and the guarded reading region cloud have a size corresponding to a tile of pixels.

In particular embodiments, the framework may include a system controller (e.g., a micro-controller unit) for programming and configuring one or more components of the framework including, for example, but not limited to, the data processing units (e.g., data producing units, data consuming units), control units, control status registers (CSRs), etc. For example, the system controller may program and/or configure a data processing unit to be data producing unit or a data consuming unit and configure their associated control units accordingly. In particular embodiments, the framework may use the system controller or a power control unit to turn on and off the data consuming unit and the data producing unit. For example, when the data consuming unit reads data in a higher speed than the data producing unit's speed for writing data, the system controller may turn on the data consuming unit only after when a minimum amount of data (enough for the data consuming unit to start to process) has been ready for reading. By delaying the powering up of the data consuming unit, the system may reduce the leakage power while the data consuming unit waits for the data to be ready. In particular embodiments, the data producing unit may notify the system controller upon the completion of the data writing process. The system controller may flush the write pointer used by the data producing unit and the associated control unit, release the guarded writing region, and allow the data consuming unit to access all buffer data. In particular embodiments, the data consuming unit may notify the system controller upon completion of the data reading process. The system controller may disable or reprogram the processing units and corresponding control units to prepare them for the next operation cycle.

In particular embodiments, the framework may use a number of control parameters for programming the control units and setting up and tearing down data buffering operations. The control parameter may include, for example, but are not limited to, operation modes (e.g., data producer or consumer control units), IDs (or CSR addresses) of the corresponding partner control units, identical set of addresses that define the base and top of the memory range mapped to the shared buffer (as seen by the producer and consumer control units), base addresses of the shared buffer in physical memory, address alignment values to a buffer size multiple (to simplify address remapping implementation), memory read and write window sizes (within which the consumer and producer are permitted to access data randomly, e.g. tile-row height, image slice height), initial consumer delays (e.g., specified as the amount of data in buffer that would trigger the consumer power on, communication period (in clocks)), and/or pointer increment size (in bytes) that triggers the pointer exchange, etc. In particular embodiments, the addresses used in the control parameters may be physical or virtual. Unlike the physical addresses, virtual addresses may be mapped to a physical memory buffer equal to the buffer size, which could be made much smaller than the full source data set. The control units may handle the virtual to physical address remapping transparently.

In particular embodiments, the framework may include a start time synchronization to trigger the data consuming unit(s) to start to read data from the buffer memory. In particular embodiments, the control unit may generate an output signal to activate the data consuming unit after a programmable amount of data becomes available in the buffer. The programmable amount data may be a minimum chunk of data (e.g., a slice, a tile, a tile row, one more lines of pixels) that may allow the data consuming unit to work on. In particular embodiments, the data consuming unit may process data with a higher speed than the data generating and writing speed of the data producing unit. To conserve power, the data consuming unit may not need to be turned on until the data producing unit has generated enough data for the data consuming unit to process. The control unit associated with the data producing unit may monitor the data generating process and data writing process of the data producing unit and may generate a start time synchronization signal (e.g., a hardware event) to start the data consuming unit when the data producing unit has generated and buffered enough data. In particular embodiments, the start time synchronization signal may be an interrupt event to the data consuming unit which may be turned on to access the buffered data and execute the data processing operation in response to the receipt of the interrupt event. By using the start time synchronization, the system may reduce the power consumption of the data consuming unit by avoiding turning on the data consuming unit before the data is ready, and significantly improve the energy efficiency of the system. In particular embodiments, the output signal may notify (e.g., as an interrupt event) a system controller which may trigger the data consuming unit to start to read and process data. In particular embodiments, the output signal may trigger the data consuming unit automatically via a power control unit sequencer.

Figure 5A:
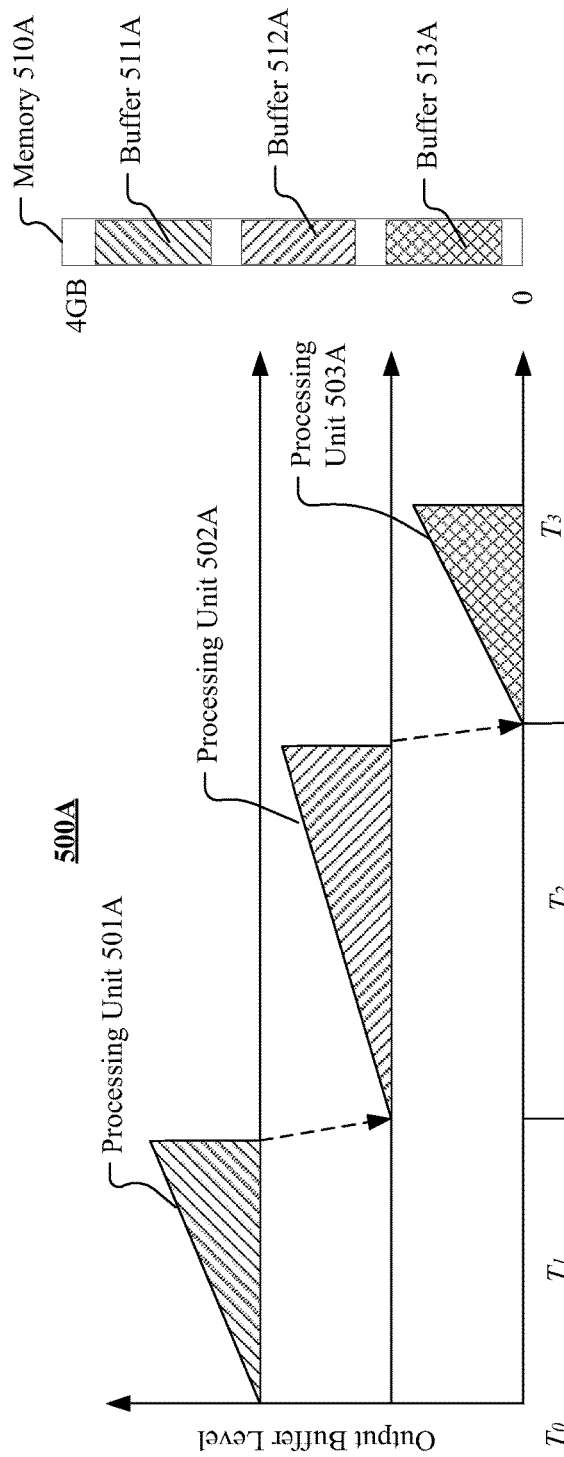
FIG. 5A illustrates an example data processing pipeline including multiple sequential steps executed by multiple processing units.

FIG. 5A illustrates an example data processing pipeline 500A including multiple sequential steps executed by multiple processing units (e.g., 501A, 502A, 503A). In particular embodiments, a data processing pipeline (e.g., a graphic pipeline) may include multiple execution steps each being executed by a different hardware accelerator or a computing/process unit. As an example and not by way of limitation, the processing unit 501A may be configured to be a data producing unit which may generate data for the later processing units 502A and 503A in the pipeline. The data generating/processing processes by the processing units of the pipeline may be executed in a sequential order. The processing unit 501A may generate data for the pipeline and stored the data in the buffer 511A in the memory 510A. After the processing unit 501A has finished generating and buffering data, the processing unit 501A may send a synchronization signal to turn on the processing unit 502A which, after being turned on, may start to read data from the buffer 511A and process the data. The processing unit 502A may generate new data for the later processing unit 503A, write the generated data into the buffer 512A, and generate a synchronization signal to turn on the processing unit 503A. The processing unit 503A, after being turned on, may start to read data from the buffer 512A, process the data, and buffer the newly generated data in the buffer 513A. During this process, the processing units may read, process, and write results sequentially at a constant speed with the corresponding output buffer being filled up quasi-linearly as shown in FIG. 5A. In particular embodiments, the buffers 511A, 512A, and 513A may correspond to memory regions that are dynamically allocated in a local memory or a system memory shared with other parts (e.g., CPUs, GPUs) of the system. Since the processing units work sequentially, the buffer 511A, 512A, and 513A may need to have respective sizes that are large enough to store all the data generated by the respective processing unit 501A, 502A, and 503A in the respective pipeline stages. In particular embodiments, the total execution time of the processing units 501A, 502A, and 503A may be approximately determined using the following equation:

$$T_{total} = T_1 + T_2 + T_3 \quad (1)$$

where, $T_{total}$ is the total execution time, $T_1$, $T_2$, and $T_3$ are the execution time of the processing units 501A, 502A, and 503A, respectively.

Figure 5B:
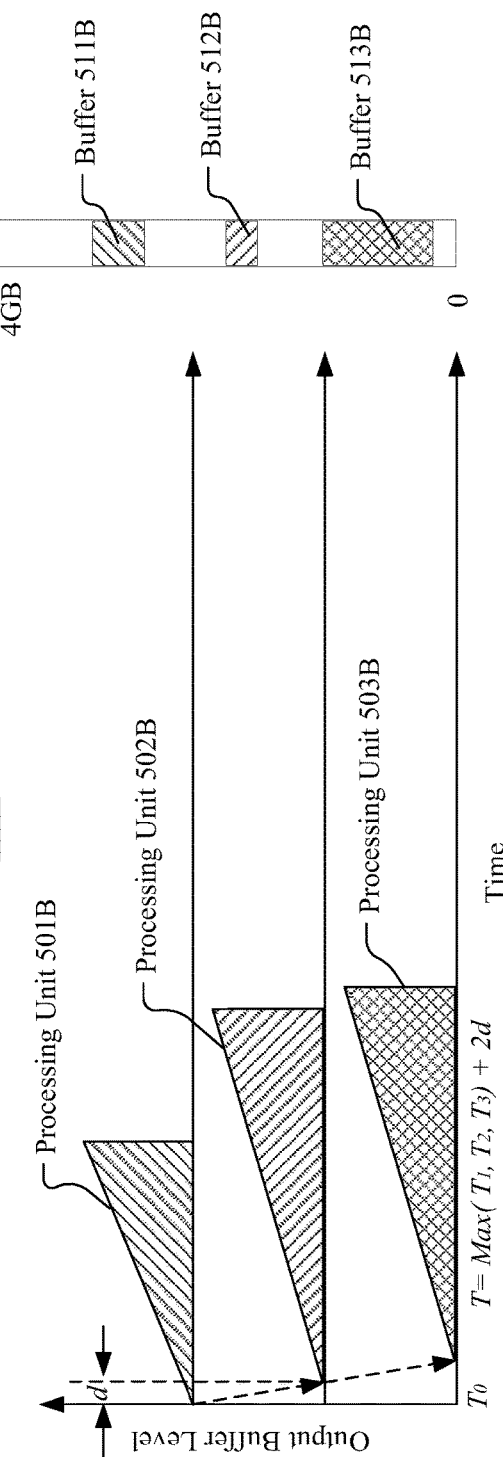
FIG. 5B illustrates an example data processing pipeline including concurrent steps executed by multiple processing units with reduced buffer memory and reduced total execution time.

FIG. 5B illustrates an example data processing pipeline 500B including concurrent steps executed by multiple processing units (e.g., 501, 502, 503) with reduced buffer memory and reduced total execution time. In particular embodiments, instead of using the sequential execution order as shown in FIG. 5A, the data processing pipeline 500B may include multiple execution steps which are concurrent (or at least partially concurrent) to each other. As an example and not by way of limitation, the processing unit 501B may generate data for the later processing unit 502B in the data processing pipeline. Instead of buffering all data in memory and turning on the later processing unit 502B after all data has been buffered, the processing unit 501B may send a synchronization signal to turn on the processing unit 502B as soon as a programmable amount of data has been generated and buffered in the buffer 511B. The programmable amount of data may correspond to a tile, a tile row, a slice, one or more lines of pixels, or any suitable chunk of data that can be separately transmitted and processed. After receiving the synchronization signal, the processing unit 502B may power up and start to read data from the buffer 511B. As descripted in earlier sections of this disclosure, the processing unit 502B may read data from a guarded reading region in the buffer 511B while the processing unit 501B writes data into a guarded writing region in the buffer 511B. As a result, the processing units 501B and 502B may work concurrently to each other. The buffer level of the buffer 511B may go up when the processing unit 501B writes data into it and may fall down when the processing unit 502B reads data from it. Since the processing unit 502B reads data from the buffer 511B in a data reading process concurrent to the data writing process of the computing 501B, the memory footprint of the buffered data could be much smaller than the sequential executed processes (as shown in FIG. 5A). As a result, the buffer 511B for passing data from the processing unit 501B to the processing unit 502B in the concurrent execution process may have a much smaller size than the buffer 511A for the sequential execution process.

Similarly, in particular embodiments, instead of buffering all data in memory and turning on the later processing unit 503B after all data has been buffered, the processing unit 502B may send a synchronization signal to turn on the processing unit 503B as soon as a programmable amount of data has been generated and buffered in the buffer 512B. After receiving the synchronization signal, the processing unit 503B may power up and start to read data from the buffer 512B. As descripted in earlier sections of this disclosure, the processing unit 503B may read data from a guarded reading region in the buffer 512B while the processing unit 502B writes data into a guarded writing region in the buffer 512B. As a result, the processing units 502B and 503B may work concurrently to each other. The buffer level of the buffer 512B may go up when the processing unit 502B writes data into it and may fall down when the processing unit 503B reads data from it. Since the processing unit 503B reads data from the buffer 512B in a data reading process concurrent to the data writing process of the computing 502B, the memory footprint of the buffered data may be much smaller than the sequential executed processes (as shown in FIG. 5A). As a result, the buffer 512B for passing data from the processing unit 502B to the processing unit 503B in the concurrent execution process may have a much smaller size than the buffer 512A for the sequential execution process. Therefore, by allowing the processing units to work concurrently, the framework may dramatically reduce the memory footprint and buffer size for buffering data and have optimal memory usage. Furthermore, by allowing the execution steps to be executed concurrently, the framework may reduce the total execution time of the pipeline as determined in the following equation:

$$T_{total} = \text{Max}(T_1, T_2, T_3) + 2 \cdot d \quad (2)$$

where, $T_{total}$ is the total execution time; $T_1$, $T_2$, and $T_3$ are the execution time of the processing units 501A, 502A, and 503A, respectively; d is the delay time for turning on a processing unit.

Figures 5C, 5D:
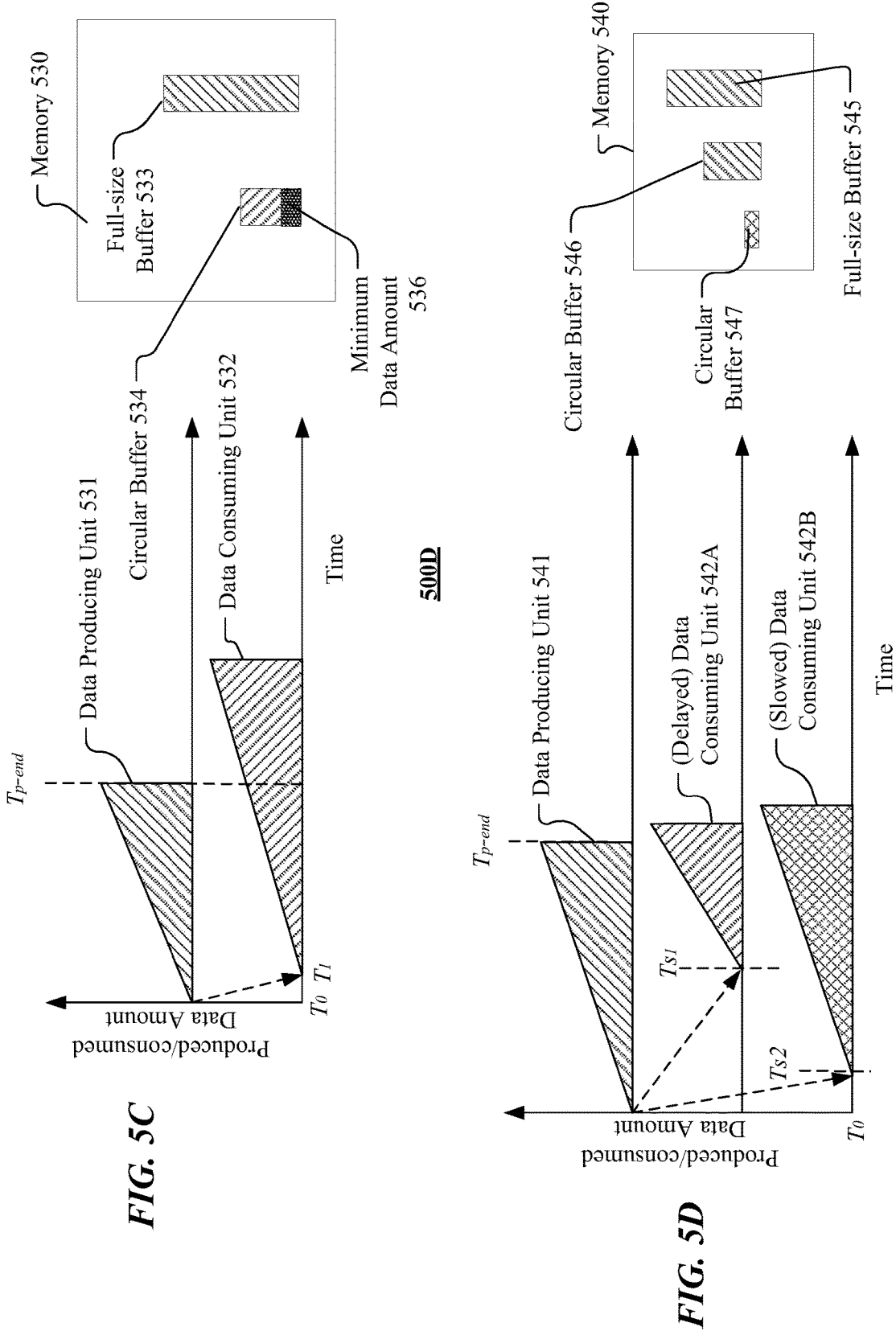
FIG. 5C illustrates an example data processing pipeline including a data producing unit and a data consuming unit which is slower than the data producing unit.
FIG. 5D illustrates an example data processing pipeline including a data producing unit and a data consuming unit faster than the data producing unit.

FIG. 5C illustrates an example data processing pipeline 500C including a data producing unit 531 and a data consuming unit 532 which is slower than the data producing unit 531. In particular embodiments, the data producing unit and data consuming unit in a data processing pipeline may have different speeds for generating and processing data. As an example and not by way of limitation, the data consuming unit 532 may process data at a speed slower than the speed for the data producing unit 531 to generate and buffer data. In particular embodiments, when the data processing pipeline has each step in a sequential order, the data producing unit 531 may need to buffer all data in a full-size buffer 533 of the memory 530. The full-size buffer 533 may need to have a size which is large enough to store all the data generated by the data producing unit 531 for this execution step.

In particular embodiment, when the data processing pipeline has concurrent execution steps, the data consuming unit 532 may be turned on to process data as soon as the data producing unit 531 has generated and buffered a programmable amount of data (e.g., a minimum data amount 536 allowing the data consuming unit 532 to work on). The data producing unit 531 may write data into a guarded writing region in the circular buffer 534 of the memory 530 allowing the data consuming unit 532 to concurrently read from a guarded writing region of the circular buffer 534. By using the racing mechanism which allows the execution steps to be executed concurrently or at least partially concurrently, the data processing pipeline may reduce the memory footprint of the buffered data during the time when the data producing unit 531 and the data consuming unit 532 work concurrently (e.g., the time period from $T_1$ to $T_{p\text{-}end}$). The memory footprint of the buffered data in the circular buffer 534 may increase when the data producing unit 531 writes data into the buffer and may decrease when the data consuming unit 532 read data from the buffer. Since the data consuming unit 532 is slower than the data procuring unit in this example, the data producing unit 531 may generate and write data into the circular buffer 534 at a higher speed than the data consuming unit 532 can read. The memory footprint of the buffered data in the circular buffer 534 may increase during the time period of $T_0$ to $T_{p\text{-}end}$ and reach the highest level at time $T_{p\text{-}end}$ when the data producing unit 531 finish generating and writing data in the circular buffer 534. However, the memory footprint of the buffered data of the circular buffer 534 may have a much smaller size than the full-size buffer 533 because the memory footprint is reduced by the concurrent data reading process of the data consuming unit 532. As an example and not by way of limitation, the data consuming unit 532 may be 1.5 times slower than the data producing unit 531. By using the racing mechanism which allows the data consuming unit 532 and data producing unit 531 work concurrently (e.g., before the time $T_{p\text{-}end}$), the size of the circuit buffer 534 may be reduced to 30% of the full-size buffer that would be required otherwise without a racing mechanism.

In particular embodiments, the framework may configure the data producing unit 531 to work slower than it could to match the slower speed of the data consuming unit 532. By slowing down the data producing unit 531, the memory footprint of the buffered data could be kept at a much lower level (e.g., the programmable data amount corresponding to the minimum data amount allowing the data consuming unit to work) since the data consuming unit 532 may read the buffered data fast enough to catch up with the data producing unit 531. The circular buffer 534 may have a size corresponding the minimum data amount that allows the data consuming unit 532 to work. However, by keeping the data producing unit 531 running for a longer time, the system may have a greater power consumption than allowing the data producing unit 531 to run faster and power off earlier. As will descripted later in this disclosure, in particular embodiments, the system may determine an optimal performance configuration by trading off the power consumption, the running speeds, and the buffer size based on the available resources and different needs of the applications.

FIG. 5D illustrates an example data processing pipeline 500D including a data producing unit 541 and a data consuming unit 532 faster than the data producing unit 531. In particular embodiments, the framework may allow a data consuming unit which is faster than the data producing unit to be turned on later than the data producing unit to reduce the power consumption by the data consuming unit. As an example and not by way limitation, the data consuming unit 542A may read and process data at a speed which is higher than the speed for the data producing unit to generate and write data into buffer. As a reference baseline, a full-size buffer 545 may be needed for buffering all data generated by the data producing unit 541 for this execution step if the data producing unit 541 and the data consuming unit 542A work sequentially. In particular embodiments, the powering up of the data consuming unit 542A may be delayed (e.g., to the time $T_{S1}$) so that the data consuming unit 542A does not need to wait once the data processing operations are started. In particular embodiments, the delayed powering on time of the data consuming unit 542A may be determined based on estimated execution time of the data consuming unit 542A and the data producing unit 541. The time $T_{S1}$ when the data consuming unit 542A in turned on may be before the completion of the data generating and writing process $T_{p\text{-}end}$ to allow the data consuming unit 542A to work concurrently to the data producing unit 541 as much as possible. The data producing unit 541 may generate and write a pre-determined data amount into a circular buffer 546 and send a synchronization signal to turn on the data consuming unit 542A when the buffered data amount could enable the data consuming unit to execute the data processing operation without waiting. In this scenario, the data consuming unit 542A may have a shorter running time, and therefore consume a smaller amount of power. The memory footprint of the buffered data and the size of the circular buffer 546 could be smaller than the full-size buffer 545 since the data consuming unit 542A works concurrently to the data producing unit 541 during the time period of $T_{S1}$ to $T_{p\text{-}end}$, and the data producing unit 541 may not need to buffer the full-size data for this execution step. As an example and not by way of limitation, the data consuming unit 542A may be two times faster than the data producing unit 541. The size of the circular buffer 546 could be 50% of the full-size buffer 545. Since the data consuming unit 542A is powered up for about 50% of the time of the total execution time of the current operation cycle, the data consuming unit may reduce its leakage power by about 50% than the situation where the data consuming unit 542A is powered on all the time of the total execution time of the current execution step (e.g., from $T_0$ to $T_{p\text{-}end}$).

In particular embodiments, the framework may allow a data consuming unit which is faster than the data producing unit to slow down to match the speed of the data producing unit. By slowing down the data consuming unit, the memory footprint of the buffered data and consequently the size of the circular buffer may be reduced. As an example and not by way of limitation, the data consuming unit 542B could read and process data at a speed which is higher than the speed for the data producing unit to generate and write data into buffer. As a reference baseline, a full-size buffer 545 may be needed for buffering data generated by the data producing unit 541 for this execution step if the data producing unit 541 and the data consuming unit 542B work sequentially. In particular embodiments, the data consuming unit 542B may be turned on as soon as a programmable data amount (e.g., a minimum data amount allowing the data consuming unit 502B to work on) is ready for the data consuming unit 542B to work on. Although the data consuming unit 542B could run faster than the data producing unit 542B, the data consuming unit 542B may be configured to slow down to match the speed of the data producing unit 542B. The data consuming unit 542B may read and process the buffered data while the data producing unit 541 generates and writes data into the circular buffer 547. Since the buffered data is read out after each small data amount being written into the buffer, the memory footprint of the buffered data cloud be kept at a much lower level (e.g., a size corresponding to the minimum data amount allowing the data consuming unit 502B to work on). As a result, the circular buffer 547 may have an even smaller size than the circular buffer 546. Furthermore, the data consuming unit 542B may have a reading bandwidth that is uniformly distributed over time (rather than peaking up at two times of the average as the delayed consuming unit 542A running at a faster speed).

However, when the data consuming unit is turned on all the time during the data reading and processing process, it may consume more power than the situation where the data consuming unit 542B is turned on for a shorter time period. In particular embodiments, the data consuming unit 542B which is slowed down to match the slower data producing unit 541 may need to wait for each data chunk to be generated and written into the circular buffer 547 by the data producing unit 541. If the waiting time period is above the threshold time, the data consuming unit 542B may be temporarily turned off to conserve power and may be turned on when the data chunk in the buffer is ready. As a result, the system may achieve a small circular buffer size for buffering data and at the same time reduce the leakage power of the data consuming unit 542B by turning on-and-off periodically the data consuming unit 542B.

In particular embodiments, the framework using the racing mechanism based on hardware or software synchronization may be implemented as a bus bridging framework cooperating with an existing system architecture. In particular embodiments, the framework may provide a number of benefits and/or tradeoff options by using the racing mechanism. For example, the framework may significantly reduce the latency of the data processing pipeline and the total execution time by allowing multiple execution steps of different data processing units to be executed concurrently. As another example, the framework may reduce the memory footprint of the buffered data and therefore the size of the buffer by using a circular buffer which allows the data to be written into the buffer and read from the buffer concurrently. As another example, the framework may allow offloading a significant portion of the software scheduling of workload. As another example, the framework may significantly reduce the power consumption of one or more data processing units by delaying the powering up of these units and turning on them for a shorter period of time. For a given pipeline latency, the framework can reduce the unit's clock to operate at a more efficient dynamic voltage and frequency scaling (DVFS) point while meeting the real time constraints. The framework may allow the unit to run at a nominal speed, a higher speed or a lower speed a reduced clock.

Figure 6:
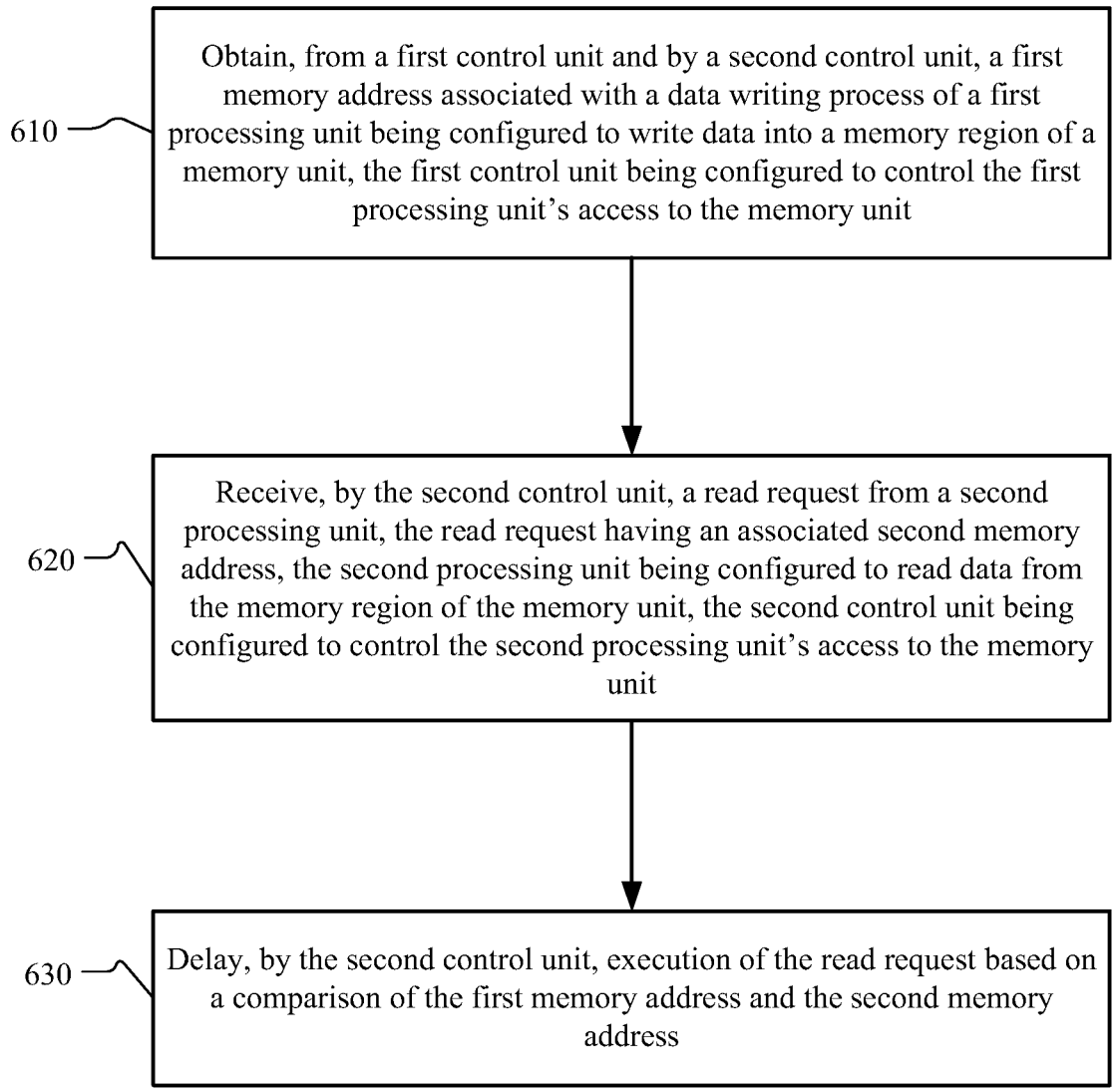
FIG. 6 illustrates an example method for coordinating a data buffering process in a generic and configurable framework with distributed control units.

FIG. 6 illustrates an example method 600 for coordinating a data buffering process in a generic and configurable framework with distributed control units. In particular embodiment, the framework described in this disclosure may be implemented in a system including, for example, but not limited to, a memory unit, a first processing unit configured to write data into a memory region of the memory unit, a second processing unit configured to read data from the memory region, a first control unit configured to control the first processing unit's access to the memory unit, a second control unit configured to control the second processing unit's access to the memory unit, etc. In particular embodiment, the first control unit and the second control unit may be connected through a communication link (e.g., a ring bus, a point-to-point link) for exchanging memory address information. In particular embodiments, the first processing unit may be configured to serve as a data producing unit and the second processing unit may be configured to serve as a data consuming unit. In particular embodiments, the first and second processing units may be configured to swap the roles of data producing unit and data consuming unit. In particular embodiments, the memory region may correspond to a linear buffer or a circular buffer dynamically allocated in the memory unit and the memory unit may be a shared memory unit with one or more other functional modules of the system.

In particular embodiments, the first processing unit may write data into a guarded writing region in the memory region. In particular embodiments, the second control unit may be configured to obtain, from the first control unit and via the communication link, a first memory address associated with a data writing process of the first processing unit. In particular embodiments, the first memory address may be, for example, a starting address, an ending address, a reference address, or any position tracker associated with the guarded writing region. The second control unit may be configured to receive a read request from the second processing unit. The read request may have an associated second memory address pointing to a memory space for reading data. The second control unit may be configured to delay execution of the read request based on a comparison of the first memory address and the second memory address. In particular embodiments, the second control unit may delay execution of the read request in response to a determination that the second memory address is greater than or equal to the first memory address. In particular embodiments, the second control unit may determine the guarded writing region based on the first memory address and may delay execution of the read request in response to a determination that the second memory address falls within the guarded writing region. In particular embodiments, the second control unit may delay the execution of the read request by temporally preventing/stalling the second processing unit from reading data from the memory region using the second memory address.

In particular embodiments, the second processing unit may read data from a guarded reading region in the memory region of the buffer. In particular embodiments, the first control unit may be configured to obtain, from the second control unit and via the communication link, a reference memory address associated with the guarded reading region. The first control unit may receive a write request from the first processing unit for writing data into the memory region using a memory writing address. The first control unit may delay execution of the write request based on a comparison of the memory writing address and the guarded reading region which may be determined based on the reference memory address associated with the guarded reading region. In particular embodiments, the first control unit may delay execution of the write request based on a determination that the memory writing address falls within the guarded reading region. In particular embodiments, the first control unit may delay execution of the write request by temporally preventing/stalling the first processing unit from writing data into the memory region using the memory writing address.

In particular embodiments, the first processing unit may access the guarded writing region using a first memory accessing pattern. The second processing unit may access the guarded reading region using a second memory accessing pattern different from the first memory accessing pattern. For example, the first memory accessing pattern may follow a tile-row scanning order and the second memory accessing pattern may be a raster scanning pattern. As another example, the first memory accessing pattern used by the first processing unit may be a first random memory accessing pattern and the second memory accessing pattern used by the second processing unit may be a second random memory accessing pattern.

In particular embodiments, the first processing unit may release memory space of the guarded writing region from the data writing process after the first processing unit has completed writing data into the guarded writing region. The second control unit may be configured to allow the second processing unit to access the memory space released from the data writing process of the first processing unit. In particular embodiments, the second processing unit may release memory space of the guarded reading region after the second processing unit has completed reading data from the guarded reading region. The first control unit may be configured to allow the first processing unit to access the memory space released by the second processing unit. In particular embodiments, the first control unit, the second control unit, and the memory unit may be connected to a network on chip through respective interfaces according to an advanced extensible interface (AXI) protocol. The memory unit may be accessed by the first processing unit and the second processing via the network on chip, the respective interfaces, and the respective control units.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for coordinating a data buffering process using a generic and configurable framework with distributed control units including the particular steps of the method of FIG. 6, this disclosure contemplates any suitable method for coordinating a data buffering process using a generic and configurable framework with distributed control units including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
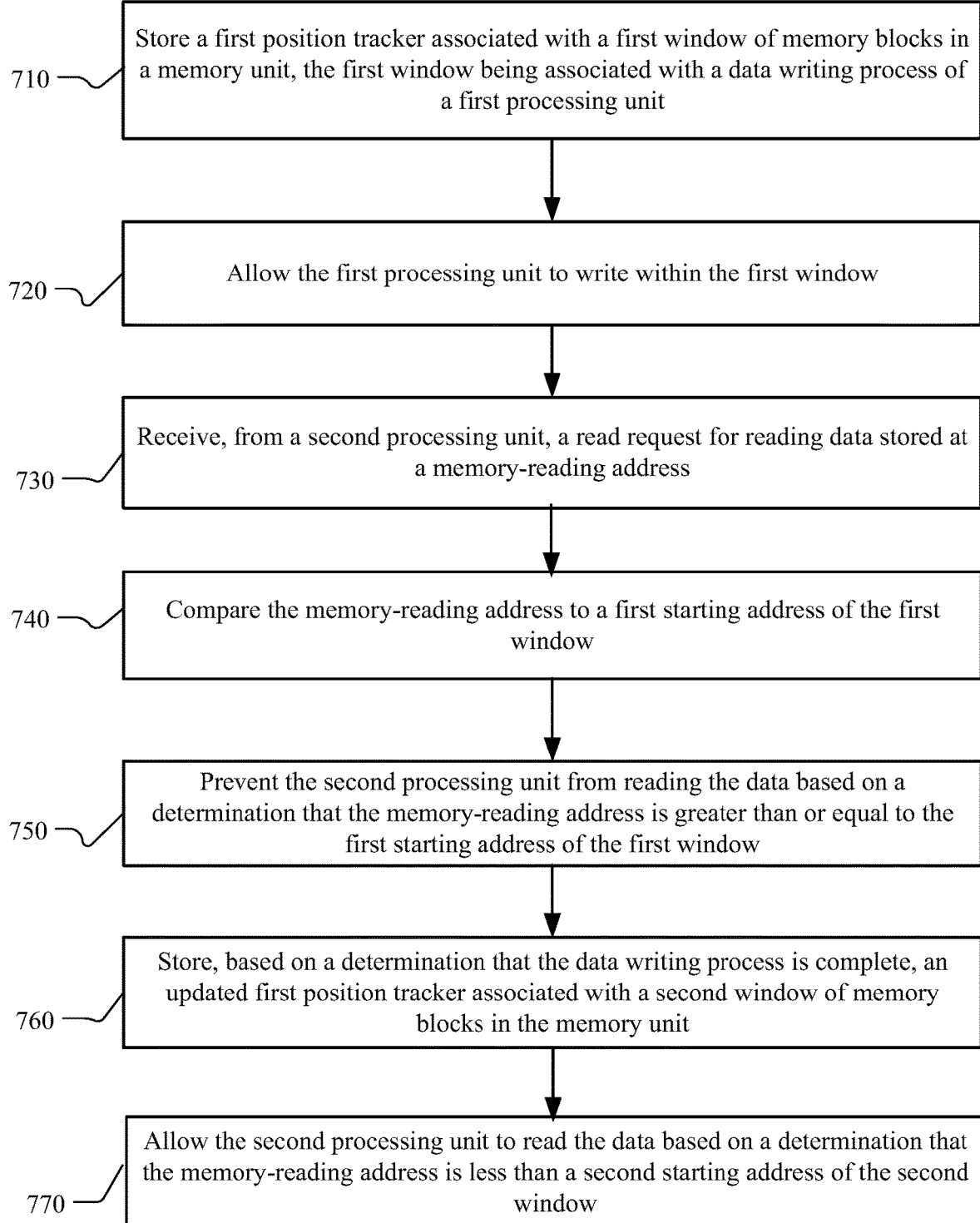
FIG. 7 illustrates an example method for efficient data buffering.

FIG. 7 illustrates an example method 700 for efficient data buffering. In particular embodiments, the framework as descripted in this disclosure may be implemented in a system including, for example, but not limited to, a first processing unit, a second processing unit, a shared memory unit for buffering data, one or more optional distributed control units, etc. In particular embodiments, the system may (e.g., using the one or more control units) store a first position tracker associated with a first window of memory blocks in a memory unit. The first window may be associated with a data writing process of a first processing unit. The system may allow the first processing unit to write within the first window. In particular embodiments, the first window of memory blocks may be protected from being accessed by the second processing unit before the first processing unit finishes writing within the first window of memory blocks.

In particular embodiments, the system may (e.g., using the one or more control units) receive, from a second processing unit, a read request for reading data stored at a memory-reading address. The system may compare the memory-reading address to a first starting address of the first window and prevent the second processing unit from reading the data based on a determination that the memory-reading address is greater than or equal to the first starting address of the first window. In particular embodiments, the system may (e.g., using the one or more control units) store, based on a determination that the data writing process is complete, an updated first position tracker associated with a second window of memory blocks in the memory unit, and allow the second processing unit to read the data based on a determination that the memory-reading address is less than a second starting address of the second window.

In particular embodiments, the memory unit may be shared with one or more other functional modules of the system. The first window of memory blocks and the second window of memory blocks may be within a dynamically allocated linear buffer or a circular buffer in the shared memory unit. In particular embodiments, the system may release the first window of memory blocks from the data writing process after the data writing process is complete and allow the second processing unit to read from the released first window of memory blocks. The second window of memory blocks may have a third starting address equal to an ending address of the first window of memory blocks. In particular embodiments, the one or more control units may include a first control unit associated with the first processing unit and a second control unit associated with the second processing unit. In particular embodiments, the one or more control units including the first control unit and the second control unit may be connected by a communication link. In particular embodiments, the comparing the memory-reading address to the first starting address of the first window may include receiving, by the second control unit, the first position tracker associated with the first window from the first control unit via the communication link and determining the first starting address of the first window based on the first position tracker.

In particular embodiments, the first and second windows of memory blocks may be within a dynamically allocated circular buffer in the memory unit. The dynamically allocated circular buffer may further include a third window of memory blocks associated with a data reading process of the second processing unit for reading data from the third window of memory blocks. In particular embodiments, the second control unit may store a second position tracker associated with the third window of memory blocks in the memory unit and allow the second processing unit to read from the third window of memory blocks. In particular embodiments, the first control unit may receive the second position tracker associated with the third window of memory blocks from the second control unit via the communication link and determine an address range associated with the third window. In particular embodiments, the first control unit may receive, by the first control unit, a write request from the first processing unit for writing into a memory-writing address and prevent the first processing unit from writing into the memory-writing address based on a determination that the memory-writing address falls within the address range associated with the third window.

In particular embodiments, the system may release the third window of memory blocks from the data reading process of the second processing unit after the data reading process is complete and allow the first processing unit to write within the released third window of memory blocks. In particular embodiments, the second control unit may store, based on a determination that the data reading process is complete, an updated second position tracker associated with a fourth window of memory blocks in the memory unit and allow the second processing unit to read from the fourth window. The fourth window of memory blocks may have a starting address equal to an ending address of the third window of memory blocks. The fourth window of memory blocks may be protected from being accessed by the first processing unit before the second processing unit finishes reading data from the fourth window of memory blocks.

In particular embodiments, the first processing unit may write into the first window of memory blocks using a first memory accessing pattern and the second process unit may read from the third window of memory blocks using a second memory accessing pattern different from the first memory accessing pattern. For example, the first processing unit may write into the first window of memory blocks using a tile-row scanning pattern and the second process unit may read from the third window of memory blocks using a raster scanning pattern. As another example, the first processing unit may write into the first window of memory blocks using a first random memory accessing pattern and the second processing unit may read from the third window of memory blocks using a second random memory accessing pattern.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for efficient data buffering including the particular steps of the method of FIG. 7, this disclosure contemplates any suitable method for efficient data buffering including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
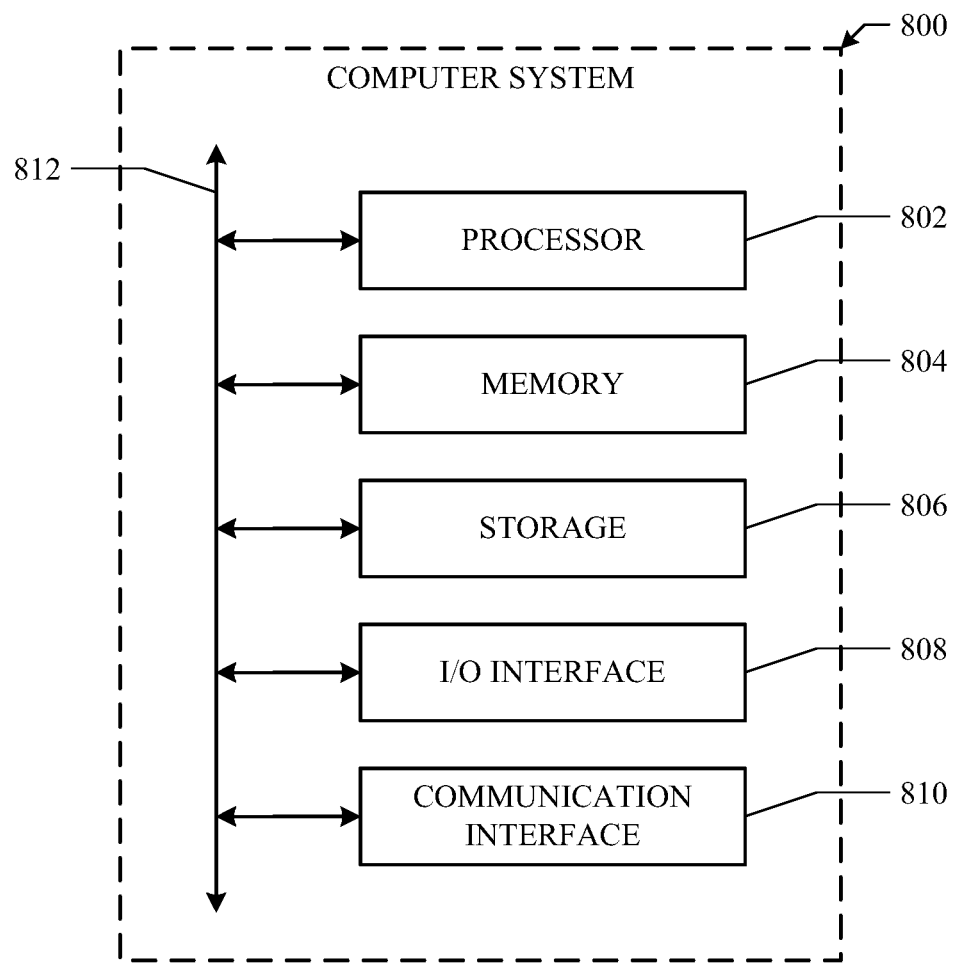
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising:
   a memory unit;
   a first processing unit configured to write data into a memory region of the memory unit;
   a second processing unit configured to read data from the memory region;
   a first control unit configured to control the first processing unit's access to the memory unit; and
   a second control unit configured to control the second processing unit's access to the memory unit;
   wherein the second control unit is further configured to:
      obtain, from the first control unit, a first memory address associated with a guarded writing region in the memory region of the memory unit, wherein the first processing unit writes data into the guarded writing region of the memory region of the memory unit using a first memory accessing pattern;
      receive a read request from the second processing unit, the read request having an associated second memory address for the second processing unit to read data from the memory region; and
      read data from the memory region based on the read request in response to a determination that the second memory address falls outside of the guarded writing region, wherein the second control unit reads data from the memory region using a second memory accessing pattern different from the first memory accessing pattern.

2. The system of claim 1, wherein the memory region corresponds to a linear buffer or a circular buffer dynamically allocated in the memory unit, and wherein the memory unit is a shared memory unit with one or more other functional modules of the system.

3. The system of claim 1, wherein the first processing unit is configured to serve as a data producing unit, and wherein the second processing unit is configured to serve as a data consuming unit.

4. The system of claim 1, wherein the first memory address is a starting address of the guarded writing region.

5. The system of claim 4, wherein the second control unit delays execution of the read request in response to a determination that the second memory address is greater than or equal to the starting address of the guarded writing region.

6. The system of claim 4, wherein the second control unit determines the guarded writing region based on the first memory address, and wherein the second control unit delays execution of the read request in response to a determination that the second memory address falls within the guarded writing region.

7. The system of claim 6, wherein the second control unit delays the execution of the read request by temporarily preventing the second processing unit from reading data from the memory region using the second memory address.

8. The system of claim 1, wherein the first control unit, the second control unit, and the memory unit are connected to a network on chip through respective interfaces based on a communication protocol, and wherein the memory unit is accessed by the first processing unit and the second processing via the network on chip and the respective interfaces as controlled by respective control units.

9. The system of claim 1, wherein the first control unit and the second control unit are connected through a communication link for exchanging memory address information, and wherein the first memory address is obtained by the second control unit via the communication link.

10. The system of claim 9, wherein the second processing unit reads data from a guarded reading region in the memory region.

11. The system of claim 10, wherein the first control unit is further configured to:
    obtain, from the second control unit and via the communication link, a third memory address associated with the guarded reading region;
    receive a write request from the first processing unit for writing data into the memory region using a memory writing address; and
    delay execution of the write request based on a comparison of the memory writing address and the guarded reading region, wherein the guarded reading region is determined by the first control unit based on the third memory address associated with the guarded reading region.

12. The system of claim 11, wherein the first control unit delays execution of the write request based on a determination that the memory writing address falls within the guarded reading region.

13. The system of claim 11, wherein the first control unit delays execution of the write request by temporarily preventing the first processing unit from writing data into the memory region using the memory writing address.

14. The system of claim 10, wherein the memory region is a dynamically allocated memory region in the memory unit, and wherein the guarded reading region has a smaller size that the guarded writing region.

15. The system of claim 14, wherein the first memory accessing pattern is a tile-row scanning pattern, and wherein the second memory accessing pattern is a raster scanning pattern.

16. The system of claim 14, wherein the second memory accessing pattern is a random memory accessing pattern.

17. The system of claim 10, wherein the first processing unit releases memory space of the guarded writing region from a data writing process after the first processing unit has completed writing data into the guarded writing region, and wherein the second control unit is configured to allow the second processing unit to access the memory space released from the data writing process of the first processing unit.

18. The system of claim 10, wherein the second processing unit releases memory space of the guarded reading region after the second processing unit has completed reading data from the guarded reading region, and wherein the first control unit is configured to allow the first processing unit to access the memory space released by the second processing unit.

19. A method comprising:
    obtaining, from a first control unit and by a second control unit, a first memory address associated with a guarded writing region in a memory region of a memory unit, a first processing unit being configured to write data into the guarded writing region in the memory region of the memory unit using a first memory accessing pattern, the first control unit being configured to control the first processing unit's access to the memory unit;

receiving, by the second control unit, a read request from a second processing unit, the read request having an associated second memory address for the second processing unit to read data from the memory region of the memory unit, the second control unit being configured to control the second processing unit's access to the memory unit; and reading, by the second control unit, data from the memory region of the memory unit based on the read request in response to a determination that the second memory address falls outside of the guarded writing region, wherein the second control unit reads data from the memory region using a second memory accessing pattern different from the first memory accessing pattern.

20. One or more computer-readable non-transitory storage media embodying software that is operable when executed to:

obtain, from a first control unit and by a second control unit, a first memory address associated with a guarded writing region in a memory region of a memory unit, a first processing unit being configured to write data into the guarded writing region in the memory region of the memory unit using a first memory accessing pattern, the first control unit being configured to control the first processing unit's access to the memory unit;

receive, by the second control unit, a read request from a second processing unit, the read request having an associated second memory address for the second processing unit to read data from the memory region of the memory unit, the second control unit being configured to control the second processing unit's access to the memory unit; and read, by the second control unit, data from the memory region of the memory unit based on the read request in response to a determination that the second memory address falls outside of the guarded writing region, wherein the second control unit reads data from the memory region using a second memory accessing pattern different from the first memory accessing pattern.

* * * * *